US007798090B2

(12) United States Patent
Hatfield

(10) Patent No.: US 7,798,090 B2
(45) Date of Patent: Sep. 21, 2010

(54) RESCUE AND LOCATIONAL DETERMINATION EQUIPMENT

(76) Inventor: Thomas Angell Hatfield, 242 Elm St., Noank, CT (US) 06340

( * ) Notice: Subject to any disclaimer, the term of this patent is extended or adjusted under 35 U.S.C. 154(b) by 0 days.

(21) Appl. No.: 12/006,639

(22) Filed: Jan. 4, 2008

(65) Prior Publication Data

US 2008/0178790 A1 Jul. 31, 2008

Related U.S. Application Data

(60) Provisional application No. 60/878,842, filed on Jan. 5, 2007.

(51) Int. Cl.
*B64B 1/68* (2006.01)
*B63C 9/02* (2006.01)

(52) U.S. Cl. ......................... 116/209; 116/210; 116/26; 116/DIG. 8; 441/89; 441/40

(58) Field of Classification Search .................. 116/26, 116/200, 209, 210, DIG. 1, DIG. 7, DIG. 8, 116/DIG. 9, DIG. 17, DIG. 44; 441/11, 13–15, 441/20, 36, 40, 42, 88–90, 92, 93
See application file for complete search history.

(56) References Cited

U.S. PATENT DOCUMENTS 2,629,115 A * 2/1953 Hansen ........................ 441/36
3,395,877 A * 8/1968 Macfadden et al. ........... 244/33
4,125,233 A * 11/1978 Winker et al. ................. 244/33
4,621,002 A * 11/1986 Kuhlmann et al. ............ 428/71
4,768,739 A * 9/1988 Schnee ........................ 244/146
4,787,575 A * 11/1988 Stewart ....................... 244/33
4,798,549 A * 1/1989 Hirsch ......................... 441/74
4,955,835 A * 9/1990 Hollingsworth .............. 441/74
5,245,943 A * 9/1993 Hull et al. ................. 116/202
5,421,287 A 6/1995 Yonover
5,736,954 A * 4/1998 Veazey .......................... 342/8
6,066,016 A * 5/2000 Yonover ...................... 441/40
6,110,661 A 8/2000 Lajoie et al.
6,164,239 A * 12/2000 Dawson ...................... 116/210
6,247,995 B1 * 6/2001 Bryan ........................ 446/473
6,422,508 B1 7/2002 Barnes et al.
6,585,549 B1 * 7/2003 Fryar .......................... 441/79
6,596,485 B2 7/2003 Anderson et al.
6,622,100 B2 9/2003 Whitsitt et al.
6,805,071 B2 10/2004 Jakubowski
6,864,852 B2 3/2005 Chiang et al.
6,876,326 B2 4/2005 Martorana
6,905,834 B1 6/2005 Simpson et al.
7,006,039 B2 2/2006 Miyamoto et al.
7,042,413 B2 5/2006 Mazoki et al.
7,046,987 B2 5/2006 Siegel et al.
7,238,075 B2 * 7/2007 Brodsky ...................... 441/80
7,270,077 B2 * 9/2007 Beck .......................... 116/210
2002/0090869 A1 * 7/2002 Hasted ........................ 441/65

* cited by examiner

*Primary Examiner*—Amy Cohen Johnson
(74) *Attorney, Agent, or Firm*—Thomas A. Hatfield

(57) ABSTRACT

A deployable signaling device and method of use thereof which includes material with detectable properties such that it can be distinguished from a background when deployed in various environments. Such detectable properties may include visible detection, detection by hyperspectral imaging sensors, radio wave detection, and/or detection other electromagnetic differentiation from the background in which the material is associated or adjacent to. In one preferred form, the selectively detectable material has an deployable shape having a plurality of directional biasing elements associated with said material.

12 Claims, 22 Drawing Sheets

RESCUE AND LOCATIONAL DETERMINATION EQUIPMENT

This application claims the benefit of U.S. Provisional Applications No. 60/878,842 filed Jan. 5, 2007 which is incorporated herein by reference in its entirety.

FIELD OF THE INVENTION

The invention generally relates to passive and/or active rescue or locational signaling devices for use in terrestrial, aquatic, and other desired environments. In particular, the invention relates to a device that can be observed and/or detected at a distance and a method of use thereof.

BACKGROUND OF THE INVENTION

The use of signaling devices is a time honored practice in both military and civilian based endeavors. In particular, over the centuries, maritime, aviation, and terrestrial expeditions have carried various items intended to enhance their detection and subsequent recovery in the event of an experienced emergency. Such things as smoke generating devices, dyes, flares, and radio broadcasting equipment have all been standard components of emergency and signaling equipment for decades.

Typically, however, these various items and techniques suffer from drawbacks which result in them being ineffective, inefficient, and/or burdensome. Conventional dye and smoke devices have a reputation of being highly transient forms of signaling due to their inherent dissipative nature. Flares and radio equipment suffer from numerous inefficiencies and burdens due to such things as their high cost, limited signal duration, limited lifetime in wet and corrosive environments, and/or their cumbersome configurations.

In the past few decades there have been efforts made to produce effective, efficient, and easily transportable devices for use when an emergency or other situation that requires signaling occurs. However, these conventional devices have been unable to adequately balance the requirements of high detectability, efficiency, transportability, and cost. For example, satellite based radio wave systems have been utilized which have not only a high cost associated with them, but require continuous ongoing maintenance to ensure their reliability. In addition, even when a general location is known based on the use of these systems, the actual recovery of equipment or personnel by recovery teams may be delayed due to the fact that these systems do not allow for differentiation from the terrain in which the equipment or personnel are present.

Furthermore, signaling devices associated with military based operations have been increasingly studied. In particular, reliable signaling or marking devices that allow for the detection of designated targets exclusively by select observers has been a desired mission parameter. For example, military missions often require that personnel, distressed vessels, stray equipment, munitions, targets, and/or other items or persons can be readily recognized separately and distinct from a visual and/or other electromagnetic background in which they are embedded or otherwise associated. Conventional marking or designation techniques and equipment have had limited success in balancing the requirements of high selective detectability, efficiency, dependability, and transportability.

SUMMARY OF THE INVENTION

Briefly stated, the present invention in a preferred embodiment is a deployable signaling device which may include material with detectable properties such that it can be distinguished from a background when deployed in various environments. Such detectable properties may include visual detectability, detectability by hyperspectral imaging sensors, radio wave detectability, and/or detectability by other electromagnetic sensing means which allows for differentiation from the background in which the material is associated or adjacent to. In one preferred form, the deployable signaling device is associated with at least one directional biasing element.

In addition, in another preferred embodiment the deployable signaling device includes an array which may be associated with or include an electrical pathway, a chemical compound or compounds, biological elements, electromagnetic energy emitting elements, and/or with electromagnetic channeling features, any or all of which allow for interaction with a propagated energy wave such that portions of the deployable signaling device have, or are caused to have a modified detectability.

The present invention, in another preferred form includes a vessel having a storage cavity; said storage cavity containing a deployable signaling device advantageously positioned so as to be accessible for deployment. Optionally, the deployable signaling device may be positioned relative to the vessel such that a dispersive element advantageously assists in deployment of the deployable signaling device.

The present invention, in another preferred form includes an array comprising a plurality of selectively detectable materials, said array interacting with a propagated energy wave such that a portion of the propagated energy wave is directed to a remotely positioned sensor.

The present invention, in one preferred form, includes a method of deploying a signaling device comprising providing a signaling device system which includes a deployable member having an associated directional biasing element; said directional biasing element having a drag end and a directional end; and placing the signaling device in a location which can be observed.

An object of the invention is to provide a selectively detectable material and a method of using the selectively detectable material which advantageously allows for the detection of the material with respect to a background associated with the material or adjacent to the material.

An object of the invention is also to produce a relatively low cost, efficient, and reliable signaling device, method of deploying a signaling device, and a method of using a signaling device.

BRIEF DESCRIPTIONS OF THE DRAWINGS

Other objects and advantages of the invention will be evident to one of ordinary skill in the art from the following detailed description with reference to the accompanying drawings, in which.

DESCRIPTION OF THE PREFERRED EMBODIMENT

With reference to the drawings wherein like numerals represent like parts throughout the several figures, a deployable signaling device in accordance with the present invention is generally designated by the numeral 10.

Figure 1:
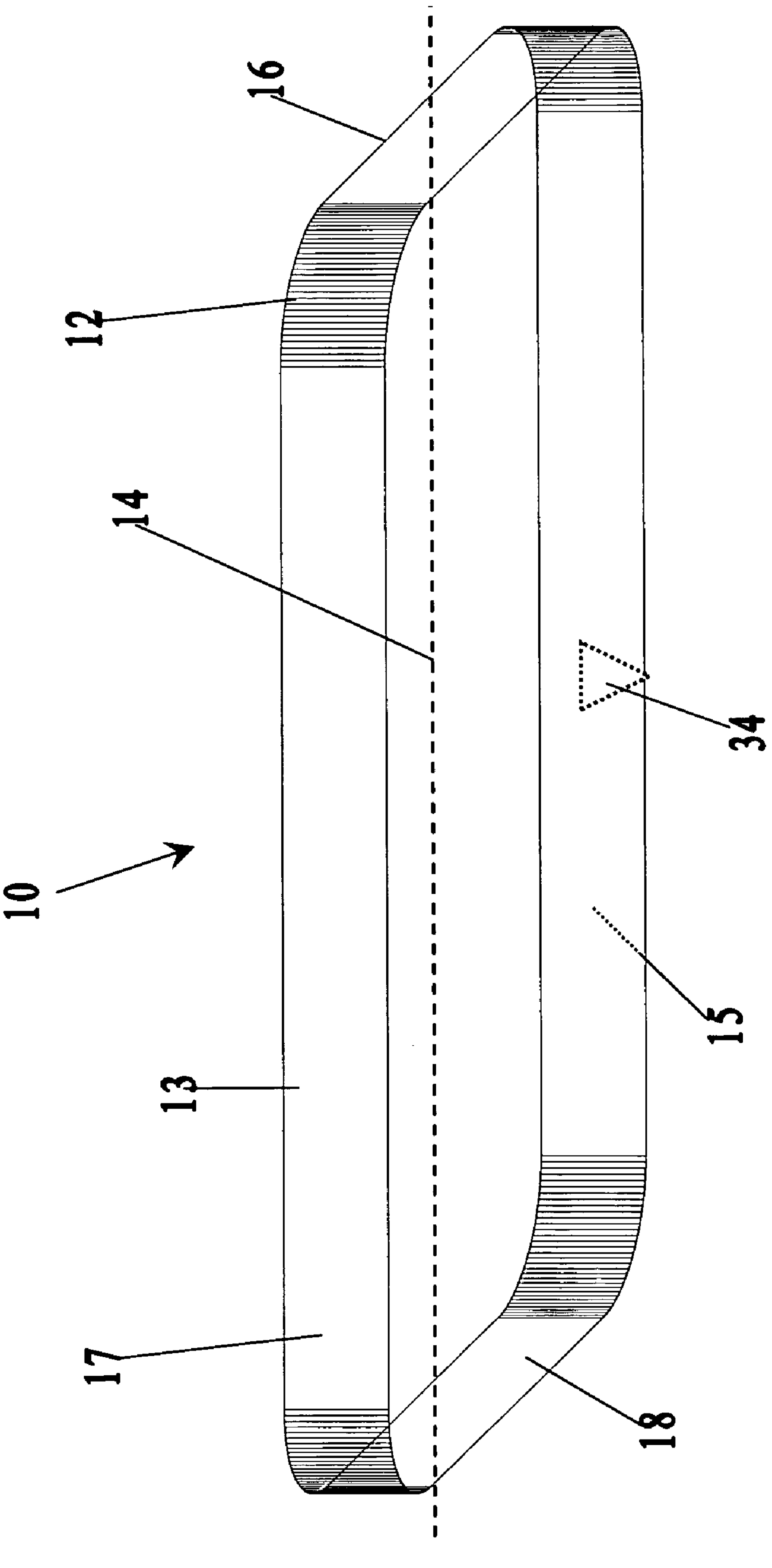
FIG. 1 is a three dimensional view of a deployable signaling device consistent with the present invention.

In one embodiment of the present invention, as shown in FIG. 1, the deployable signaling device 10 includes a deployable member 12 having, an upper surface 13, a lower surface 15, a border area 17, a center axis 14, a remote end 16, an attachable end 18, and an associated directional biasing element 34. In one embodiment of the present invention, the directional biasing elements 34 is associated with the lower surface 15.

The deployable member 12, in one embodiment of the present invention, may included material, or may be associated with materials, which provide the desired advantageous electromagnetic interactive properties. For example, the deployable member 12 may include material, or may be associated with materials, which exhibit, or can be made to exhibit, a higher reflectivity to electromagnetic energy, such as radar pulses, than, for example, the ocean surface. This higher reflectivity to electromagnetic energy, among other things, will yield, in the case of radar energy, a more intense radar signal return than the ocean surface. For example, the size, shape, surface characteristics, and the dielectric properties at the surface of the deployable member 12 may be configured, or may be modified, to advantageously affect the portion of the transmitted radar energy that is reflected back to the radar unit from deployable member 12.

Figure 2:
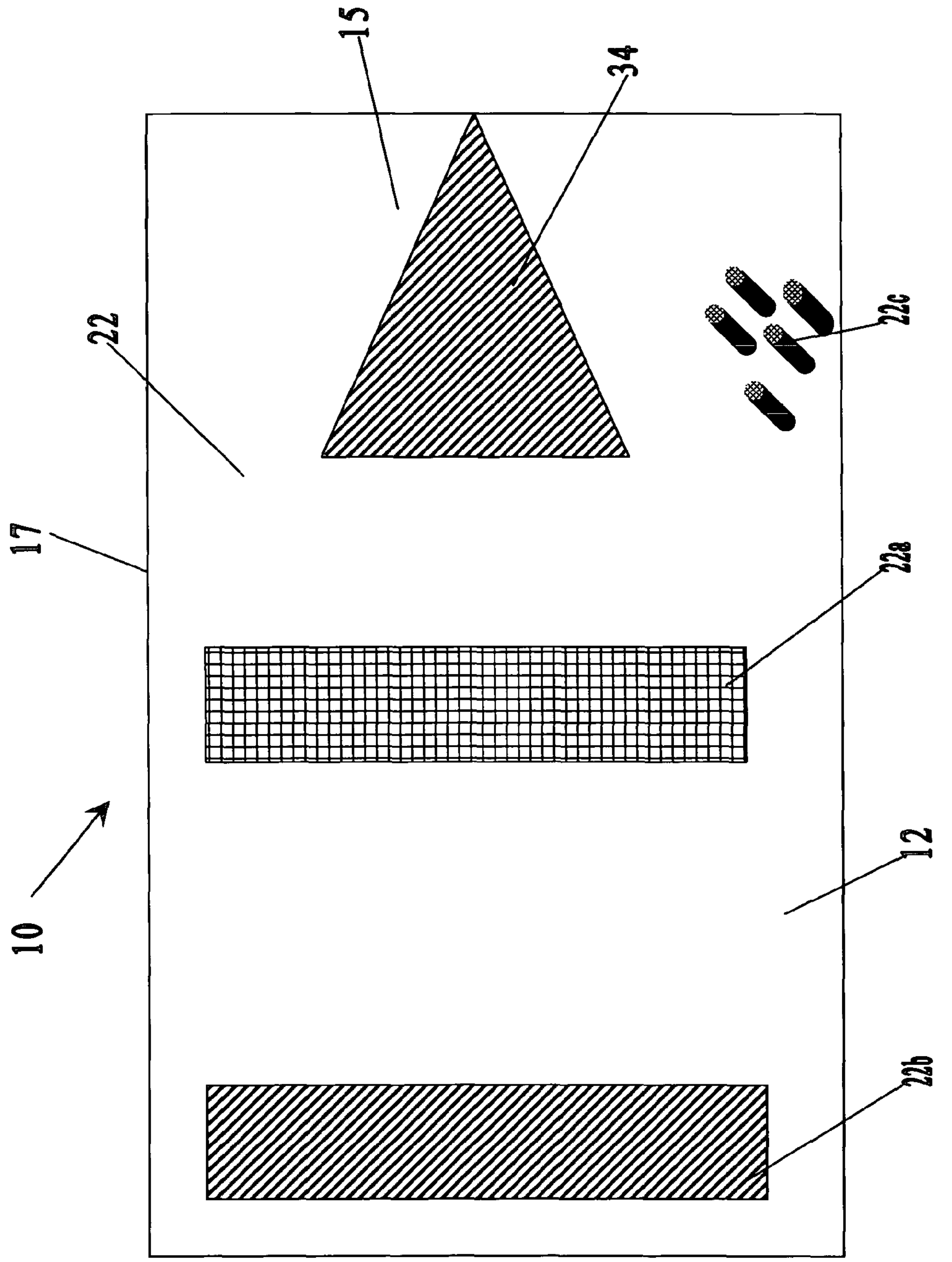
FIG. 2 shows a portion of a deployable signaling device wherein the deployable member includes various elements consistent with the present invention.
Figure 3:
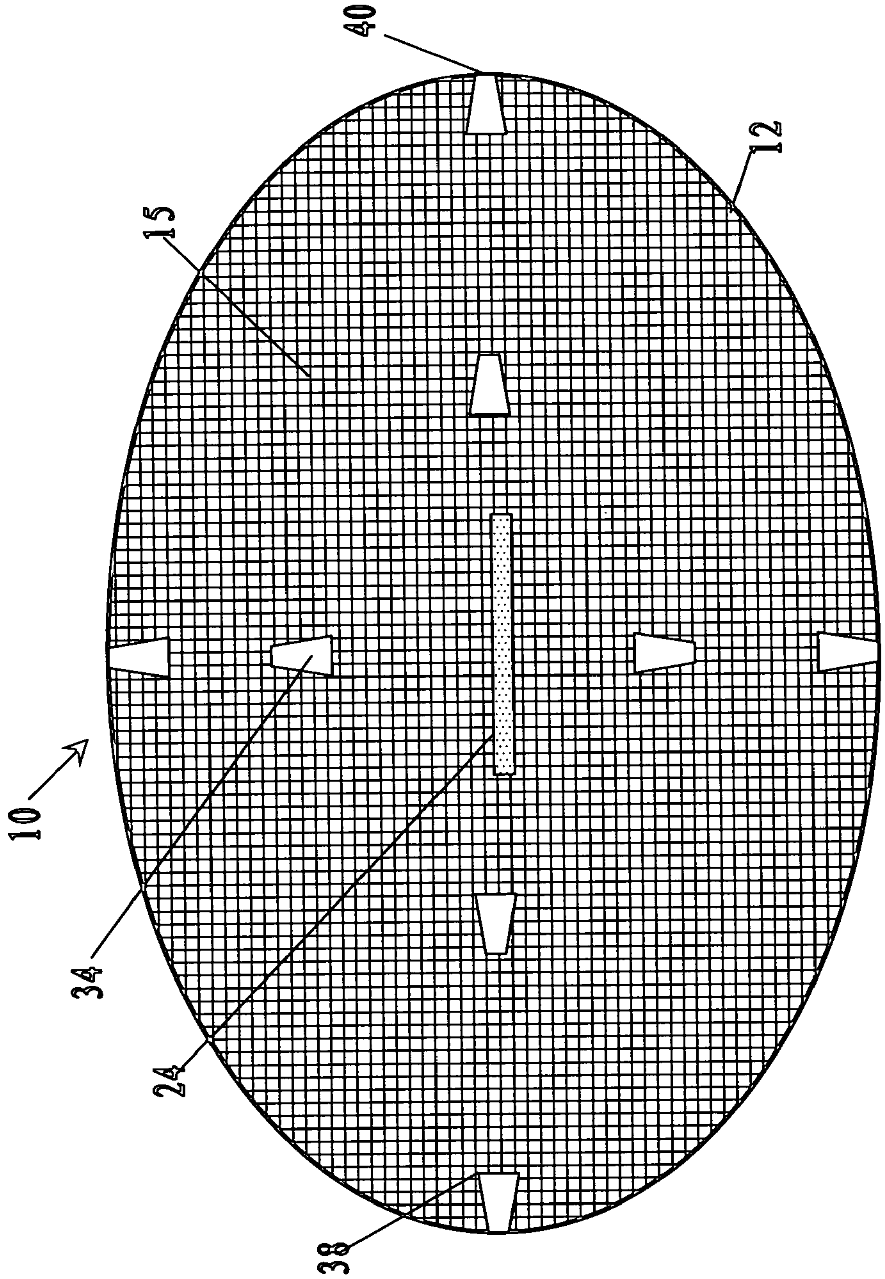
FIG. 3 shows a deployable signaling device which has a substantially circular configuration and includes a deployable member having density elements consistent with the present invention.
Figure 4:
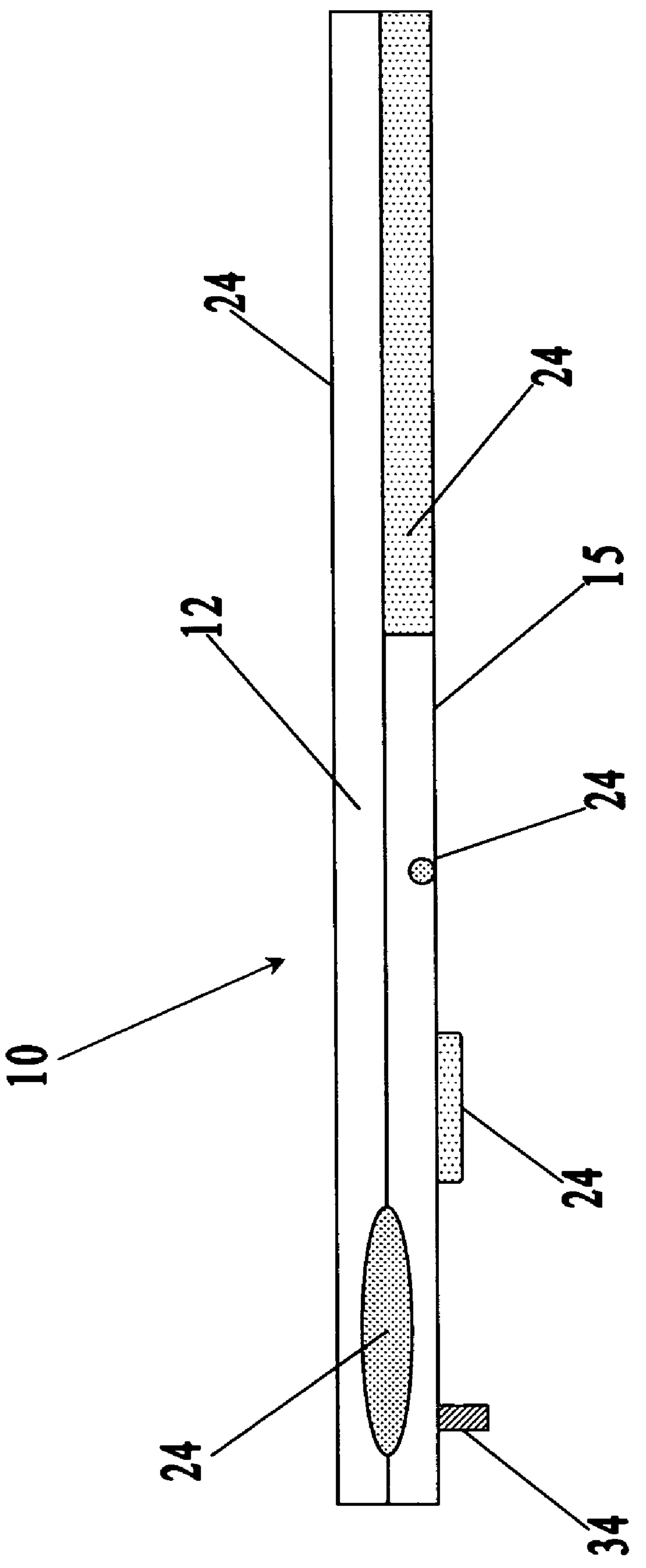
FIG. 4 shows a cut away view of a portion of a deployable signaling device wherein the deployable member includes a variety of illustratively associated density elements consistent with the present invention.

In one embodiment of the present invention the deployable member 12 may have an advantageous structural configuration and/or geometric design. For example, the deployable member may, as shown in FIG. 2, include a contiguous fabric 22, a mesh 22*a*, a netting 22*b*, appendages 22*c* and/or any other combination of perforations, discontinuities, or attachments which allow for advantageous deployment characteristics in, for example, liquid. In addition, as shown in FIG. 3, the density of the deployable member may be varied anywhere throughout its dimensional area by, for example, the inclusion of density elements 24 to provide advantageous deployment characteristics in, for example, a liquid such as seawater. For example, the deployable member 12, as shown in FIG. 4, may be associated with any number of gas, liquid, foam, and/or gel density elements 24. The density elements 24 may be present throughout internal and/or external portions of the material comprising the deployable member 12. The density elements 24 may be formed in various configurations. For example, the density elements 24 may take the shape of rods, tubes, plates, ribbons, sheets, bladders, nodules, cisterns, cavities, and/or the like.

Figure 5:
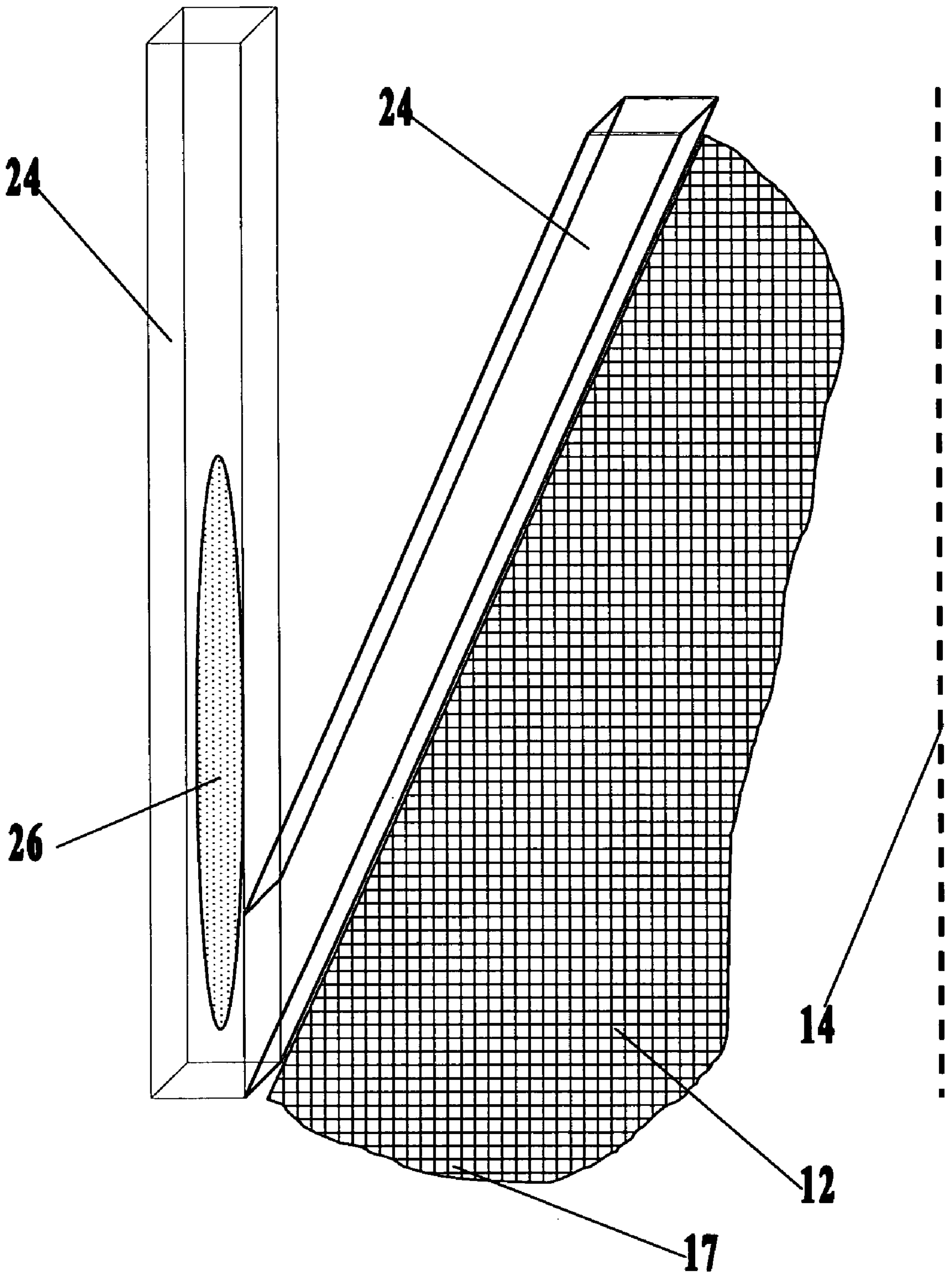
FIG. 5 shows a portion of a deployable signaling device wherein the deployable member is associated with density elements that are fluidly connected and which contain buoyancy modifying material consistent with the present invention.

In one embodiment of the present invention, as shown in FIG. 5, the density elements 24 may be fluidly connected and may contain, in addition to or at the exclusion of ambient gas, a buoyancy modifying material 26 which may be, for example, foam or other low density materials, or may be materials which when exposed to liquid, for example water, produces entrained gas and/or foam that may be contained or be associated with the density elements 24 such that positive buoyancy is achieved. Thus, in operation, when exposed to the liquid the associated deployable member 12 is acted on by the buoyancy modifying material 26 within the density elements 24 such that, for example, the rigidity, buoyancy, and/or strength of portion the deployable member 12 are modified by, for example, the expansion of foam.

The deployable signaling device 10, in one embodiment of the present invention, may include material, or be associated with materials, which exhibit desirable properties when used advantageously in combination with hyperspectral imaging. For example, the deployable member 12 may include material or be associated with material such as fabrics, plastics, laminates, non-woven material, polymers, metals, ceramics, glasses, naturally occurring material, synthetic materials, and/or chemical and/or mechanical treatments/processing of these various materials, or combinations of various materials which enhance the detectable differentiation of the deployable signaling device 10 from material which the deployable signaling device 10 is associated with or adjacent to. These materials which the deployable signaling device 10 is associated with or adjacent to may also be referred to as the background.

In one embodiment of the present invention, a hyperspectral sensor detects energy reflected by portions of the deployable signaling device 10 and energy reflected by materials adjacent to the deployable signaling device 10. Information collected from the hyperspectral sensor is then processed such that the intensity of the reflected energy in different parts of the energy spectrum is analyzed. For example, reflected energy from the deployable member 12 can be of a unique enough nature, with regard to a certain portion of the energy spectrum, so as to enhance differentiation of the deployable signaling device 10 from the electromagnetic background by hyperspectral imaging even though the detectable portion(s) of the deployable signaling device 10 is/are sub-pixel in size. For example, hyperspectral imaging of a mountainous region, ocean surface, desert landscape, or other imaged area will result in the deployable signaling device 10 being differentiated from the background when the deployable signaling device 10 provides a reflected energy signal that is unique from the background.

Figure 6:
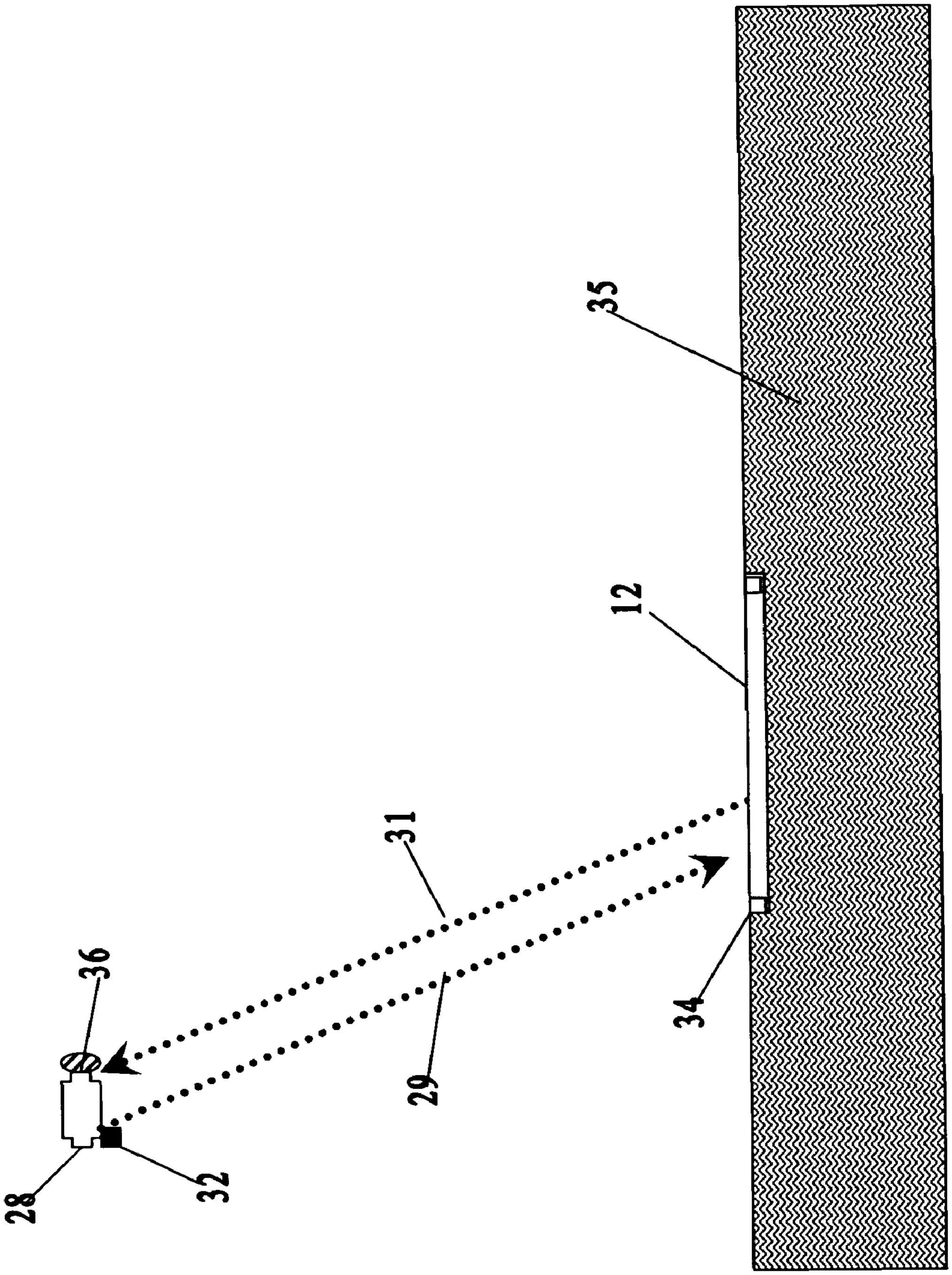
FIG. 6 shows an illustrative system incorporating a deployable member, a sensor, an illumination source in addition to ambient illumination, if present, and a background consistent with the present invention.

In one embodiment of the present invention, as shown in FIG. 6, the deployable signaling device 10 includes an associated or remote energy system 28 that can be utilized from ground-based or airborne platforms and which may not necessarily require sunshine for the illumination energy 29, and thus may not be restricted to daylight and fair-weather operation. For example, the deployable member 12 may be used in combination with a hyperspectral sensor 30 and with an associated or remote energy system 28, such as a laser or other illumination source 32, such that the deployable member 12 may be differentiated from the background 35 in daylight, at night, and/or under adverse meteorological conditions. For example, portions of the deployable signaling device 10 may be illuminated by the illumination source 32 such that reflected energy 31 from portions of the deployable signaling device 10 may be detected and differentiated from the background 34. It should be noted that the hyperspectral sensor 30 may be any military or commercial imager or system. Illustrative examples of such imagers and systems are the NASA Hyperion sensor, Advanced Land Imager (ALI); Airborne Visible Infrared Imaging Spectrometer (AVIRIS), Compact High Resolution Imaging Spectrometer (CHRIS). It should also be noted that, in some embodiments of the present invention, the hyperspectral sensor 30 may be replaced by, or may be used in conjunction with, a high resolution sensor, such as CARTOSAT-1; a multispectral sensor, such as ASTER; or a radar sensor, such as ERS-1, ERS-2, JERS-1, RADARSAT-1, RADARSAT-2. In one embodiment of the present invention, the illumination source 32 may be a laser source such as a blue-green laser which has advantageous penetration characteristics with respect to water. In addition the system 28 may be configured such that that the illumination source 32 and the hyperspectral imager 30 are in relatively close proximity such that the effect of shadowing is reduced or eliminated.

Figure 7:
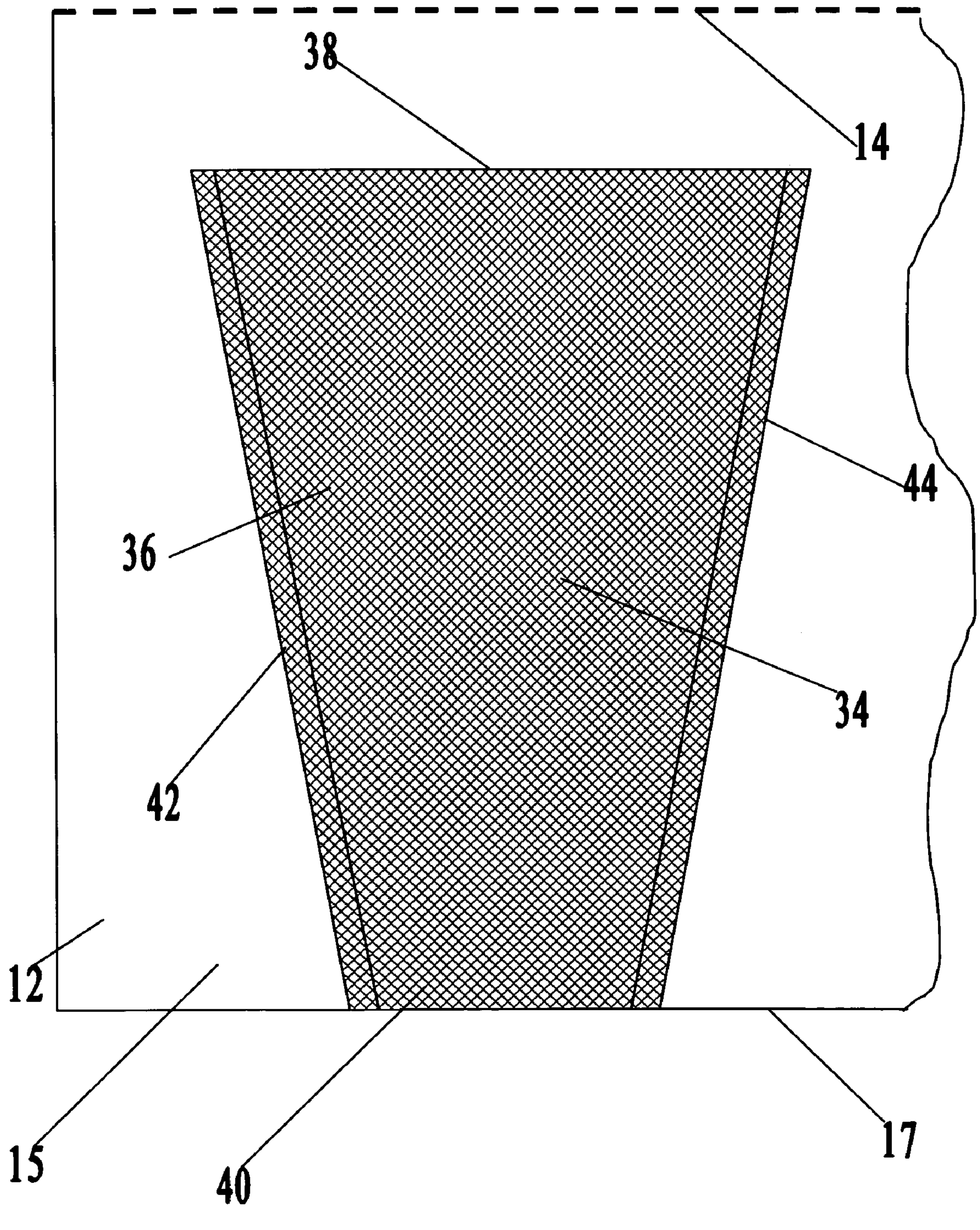
FIG. 7 shows a directional biasing element associated with a deployable signaling device consistent with the present invention.

The associated directional biasing element 34, in one embodiment of the present invention, is advantageously positioned such that when the directional biasing element 34 interacts with water, the directional biasing element 34 exerts, among other things, a motive force on the deployable member 12. As shown in FIG. 7, the directional biasing element 34 may, for example, be formed from a panel 36 that is contoured, or is made to be contoured, such that it includes a drag end 38 and a directional end 40. The panel 36 may be attached directly to the deployable member 12 by a first panel edge 42 and a second panel edge 44 such that the drag end 38, in one embodiment of the present invention, is facing in a direction which intersects the center axis 14 of the deployable member 12. It should be noted that the panel 36 may be composed or otherwise formed of any variety of materials, or combinations of materials, which allow for a drag end 38 and a directional end 40 to be present. For example, the panel 36 may be formed from molded plastic, synthetic and/or natural fibers, fabrics, polymers, metals, ceramics, glasses, and/or other materials which provide or synergistically contribute to the necessary physical characteristics which allow and/or enhance directional biasing to occur when incorporated into any of the embodiments of the present invention.

Figure 8:
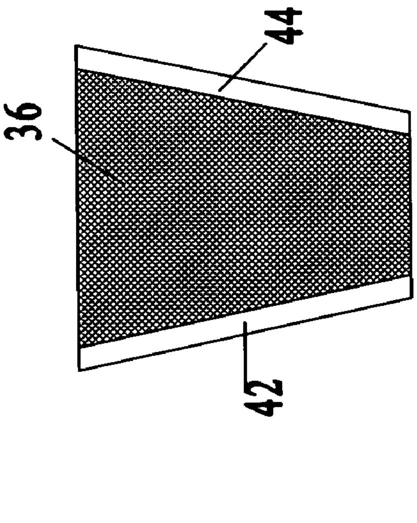
FIGS. 8 through 8C show various configurations of directional biasing elements that achieve a higher resistance moving in a first direction through a deployment environment, not shown, than in a second direction through a deployment environment consistent with the present invention.
Figure 8A:
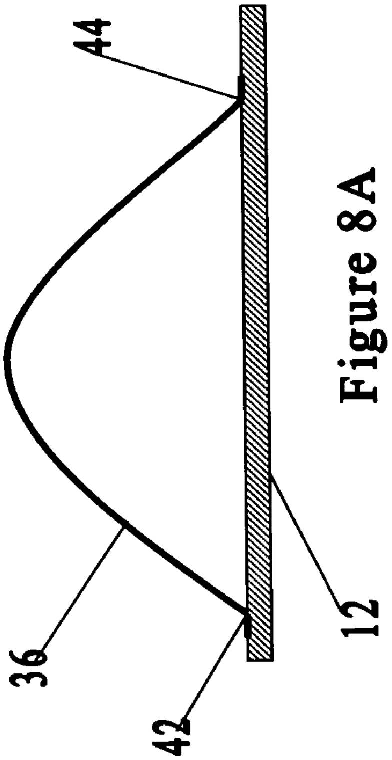
FIG. 8D shows an example of a pair of directional biasing elements being spatially juxtaposed with one another consistent with the present invention.
Figure 8B:
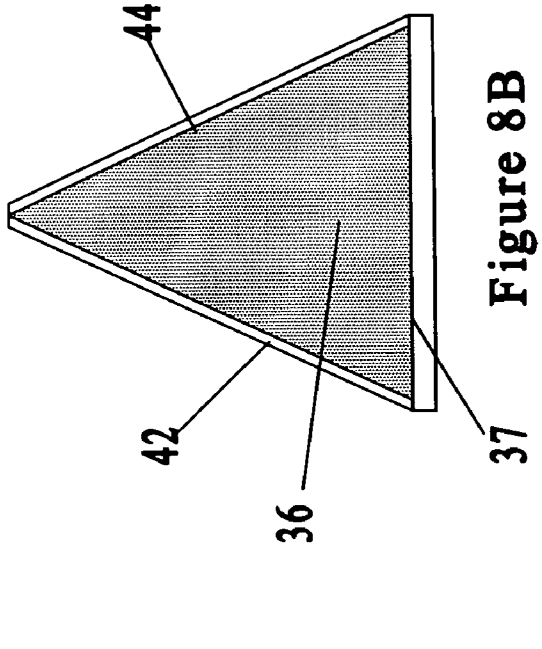
Figure 8C:
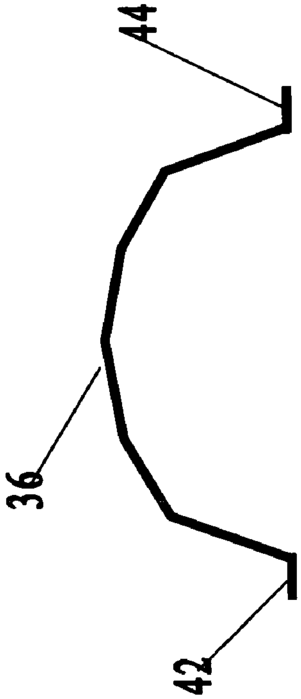

In one embodiment of the present invention, as shown in FIG. 8, the panel 36 is a flexible substantially planar element having a substantially triangular configuration. The panel 36 when attached by the first panel edge 42 and the second panel edge 44 to, for example, the deployable member 12, as shown in FIG. 8A, takes on a contoured configuration. The first panel edge 42 and the second panel edge 44 may be attached to the deployable member 12 by, for example, stitching, adhesives, thermal bonding, and/or other means which allow for attachment to the deployable member 12. In one embodiment of the present invention, as shown in FIG. 8B, the panel 36 is associated with at least one rib 37 which may be associated with the panel 36 such that a contoured configuration of the directional biasing element 34 is achieved. The rib 37 may be formed from a flexible, semi-rigid, or rigid material, and may have a positive, neutral or negative buoyancy. The rib 37 may be formed from, for example, fabric, metal, laminate, plastic, composites, or the like. In one embodiment of the present invention, as shown in FIG. 8C, panel 36 may be molded from, for example, plastic such that it is contoured prior to attachment.

Figure 8D:
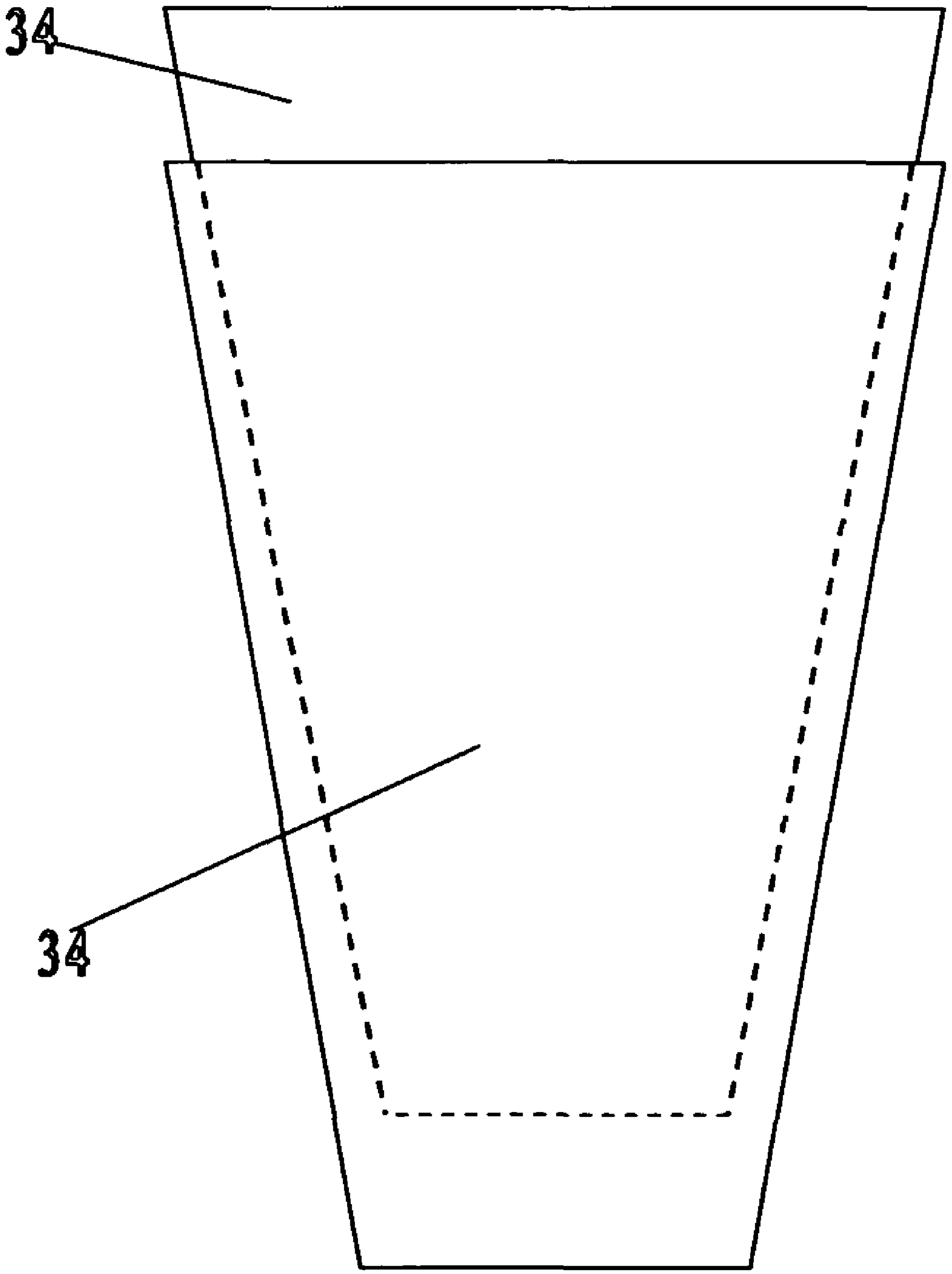

In one embodiment of the present invention, as shown in FIG. 8D, multiple directional biasing elements 34 may be nested, or otherwise advantageously associated, such that the deployable signaling device 10 may be efficiently packaged and/or deployed.

Figure 9:
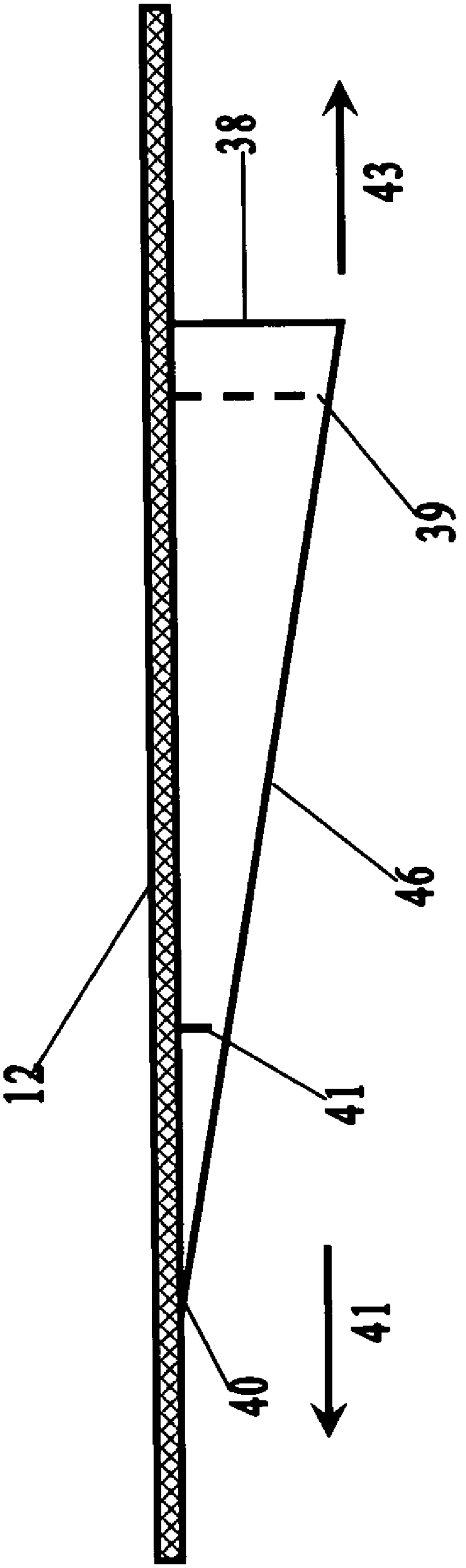
FIG. 9 shows a directional biasing element and associated deployable member consistent with the present invention.

In one embodiment of the present invention, as shown in FIG. 9, the directional biasing element 34 moves with less resistance through a gas or liquid, for example seawater, in a first direction 41 than in a second direction 43. In operation, this differential in moving resistance can be achieved, for example, by providing an interface surface 46 between the drag end 38 and the directional end 40 which has a contoured shape that allows for the directional biasing element 34 to have greater resistance moving in the direction of the drag end

38 than in the direction of the directional end 40. The contoured shape can be, for example, tapered or partially tapered such it incorporates pyramidal, conal, polygonal, funnel, and/or other angular features that enhance directional biasing when incorporated into any of the embodiments of the present invention. It should be noted that the directional biasing element 34 may be solid, partially solid, or hollow. In addition, the drag end 38 and the directional end 40 may fluidly connected such that fluid entering the drag end 38 may flow to or may exit out of the directional end 40.

In one embodiment of the present invention, a first internal dimension 39, adjacent the drag end 38, has a greater dimension than a second internal dimension 300, adjacent to the directional end 40.

Figure 10:
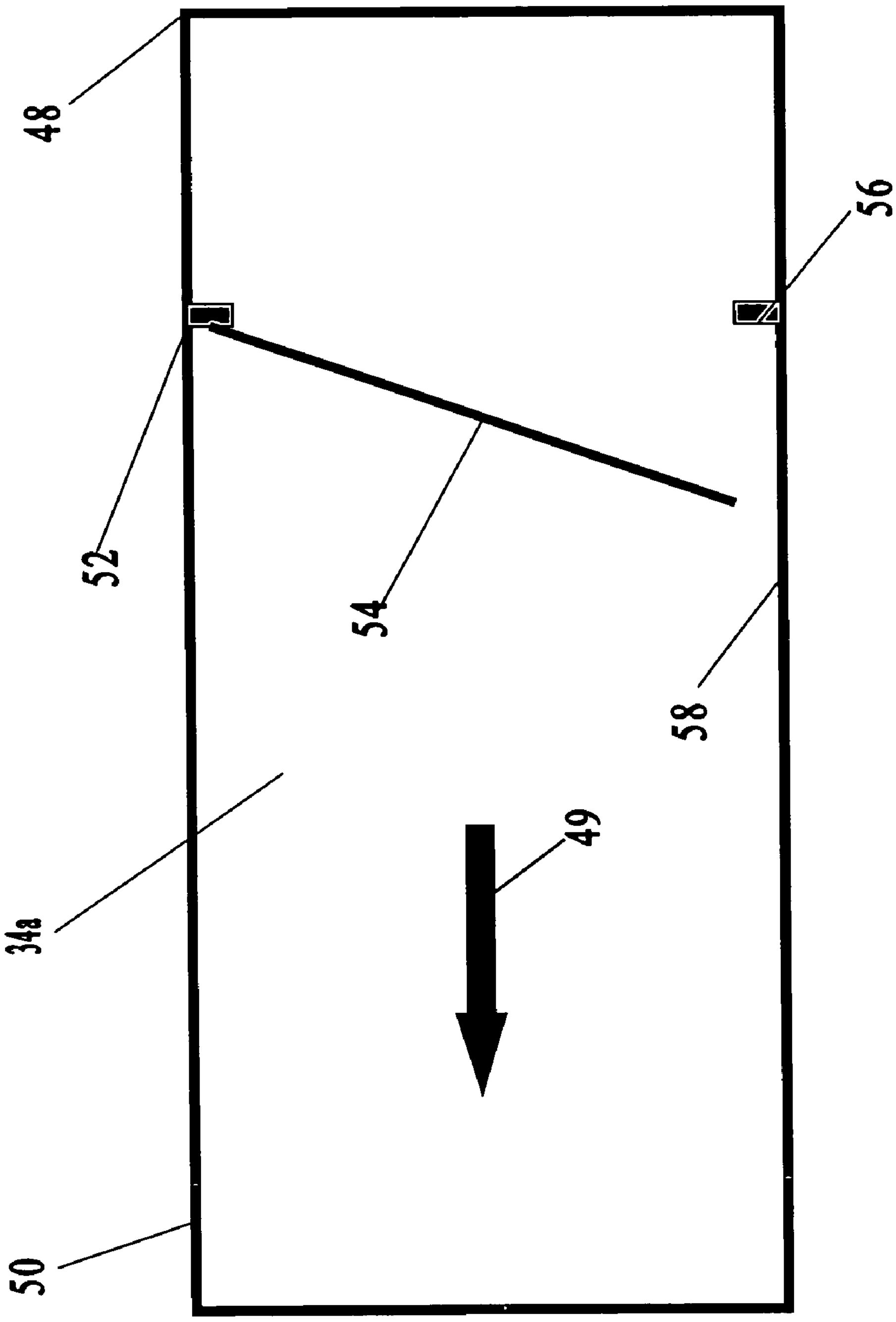
FIG. 10 shows a directional biasing element consistent with the present invention.

In one embodiment of the present invention, as shown in FIG. 10, the directional biasing element 34*a* may be formed such that it has a first open end 48 and a second open end 50. The directional biasing element 34*a* may be any of, or combination of, a variety of geometric shapes, for example, oval, round, triangular, square, rectangular, or other polygonal and/or radial shape. Intermediate the first open end 48 and the second open end 50 is a flow biasing element 52. In operation, the flow biasing element 52 allows fluid, for example liquid and/or gas, to move preferentially in a direction 49 from the first open end 48 to the second open 50. For example, the flow biasing element 52 may be a flap 54 which interacts with an internal ridge 56 or other limiting element that may be present on the interior wall 58 of the directional biasing element 34*a*.

Figure 11:
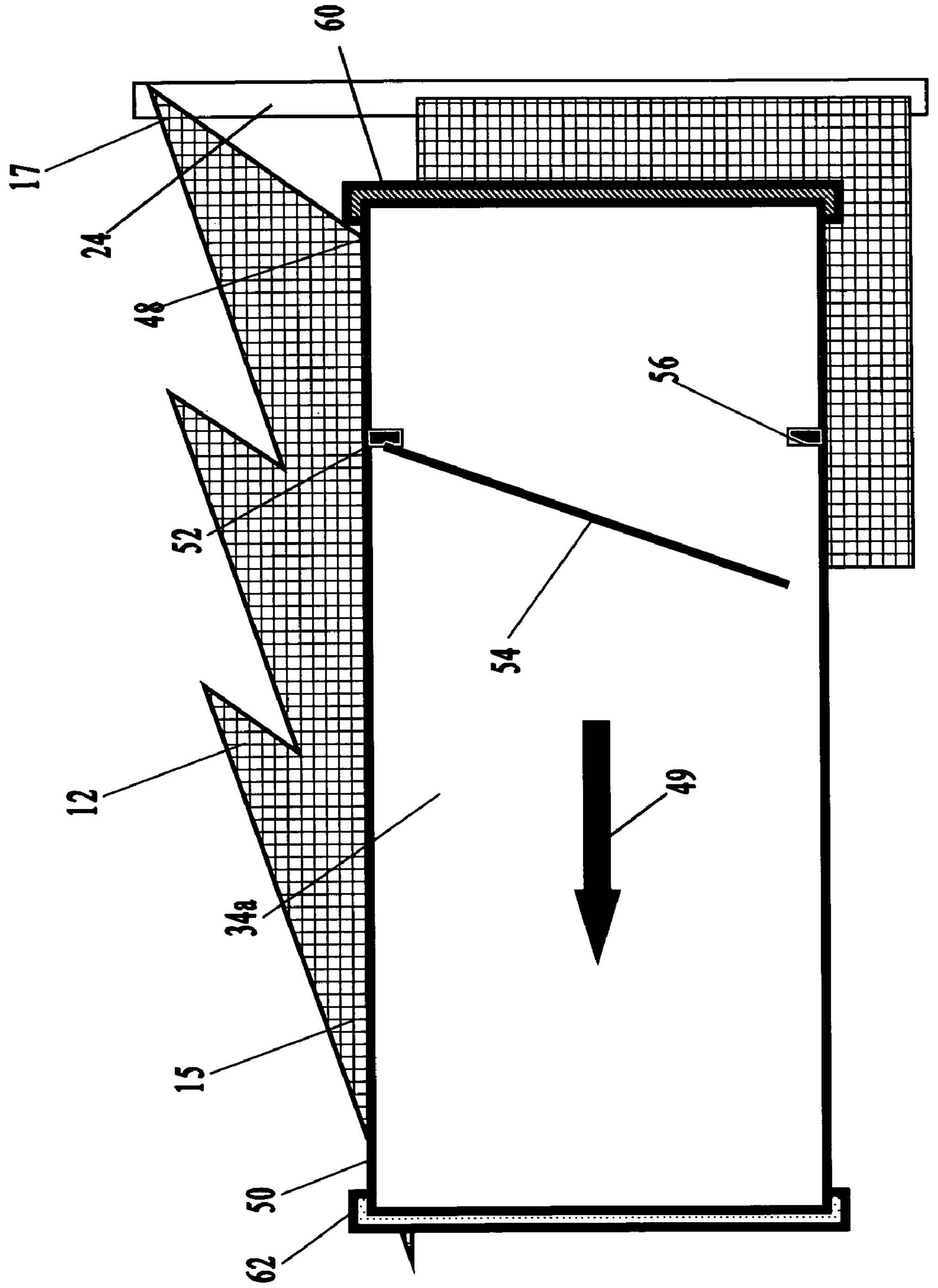
FIG. 11 shows a directional biasing element, associated buoyancy modifying elements associated with the directional biasing element and an associated deployable member consistent with the present invention.

In one embodiment of the present invention, as shown in FIG. 11, the directional biasing element 34*a* may be formed such that it has a first open end 48 and a second open end 50 wherein a weighted component 60 and/or a buoyant component 62 is associated with either, or both, the first open end 48 and the second open end 50. In operation, in one embodiment of the present invention, when the directional biasing element 34*a* is associated with the deployable member 12, the weighted component 60 and/or the buoyant component 62 act to impart and/or enhance motion to the directional biasing element 34*a* in a liquid environment. For example, the weighted component 60 may be positioned such that it causes the second open end 50 to be negatively buoyant, and the buoyant component 62 may be positioned such that it causes the first open end 48 to be neutrally or positively buoyant, thus when placed into a liquid environment and, for example, associated with the deployable member 12 any turbulence and/or wave action in the liquid will be advantageously utilized through an oscillating type action as the second open end 50 sinks and the buoyant component 62 and/or the association of the directional biasing element 34*a* with the deployable member 12 counter and/or redirect the sinking of the second open end 50. It should be noted that the directional biasing element 34*a* may also be comprised of material or materials that function to provide the desired buoyancy characteristics for the directional biasing element 34*a*. In one embodiment of the present invention a buoyancy modifying component, a portion of which moves between an area adjacent the first open end 48 and the second open end 50 may be included.

Figure 12:
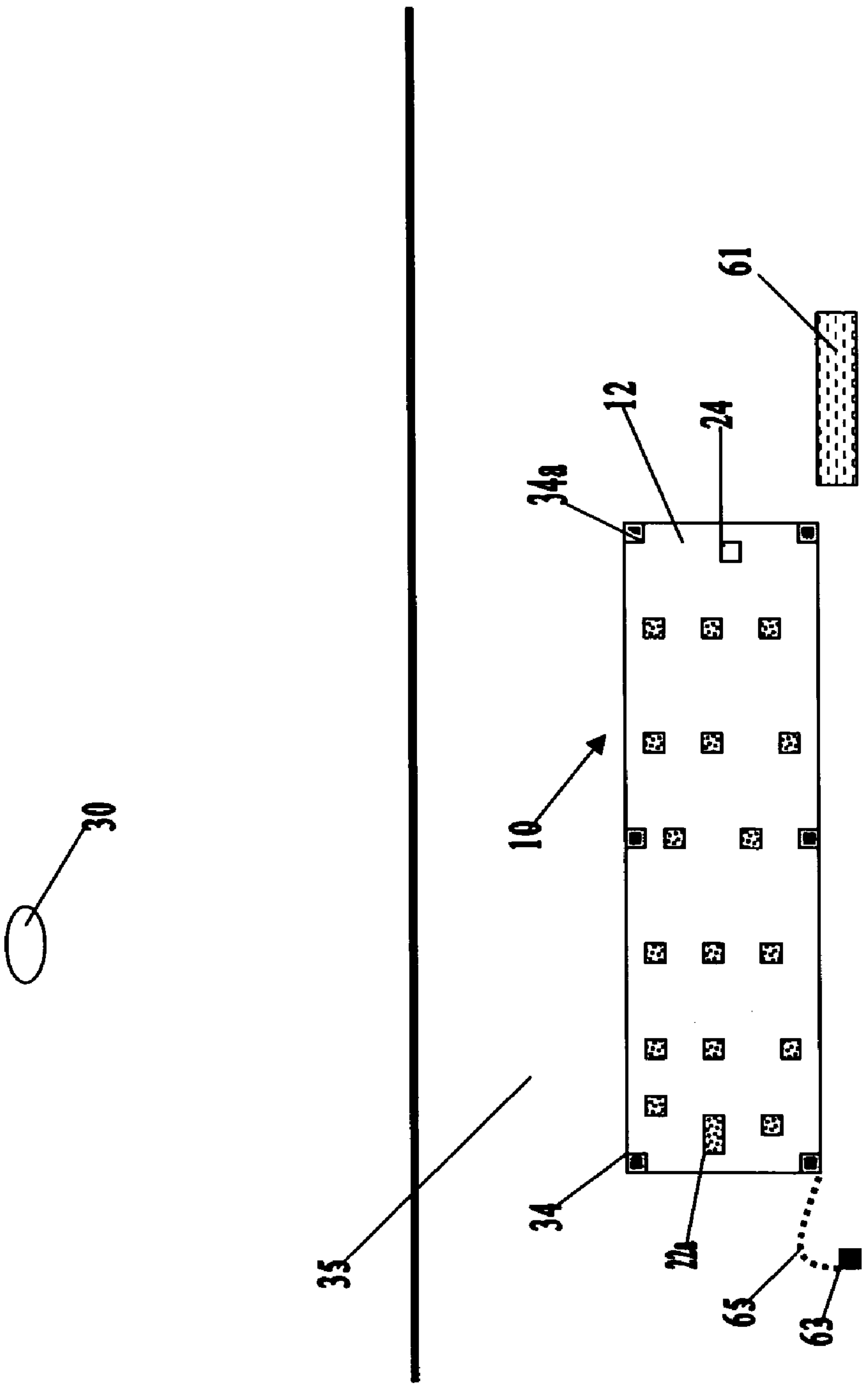
FIG. 12 shows a deployed submerged deployable signaling device in a deployment environment that is adjacent to a sensitive or selected area consistent with the present invention.

In one embodiment of the present invention, as shown in FIG. 12, the signaling device 10 may be utilized such that it is partially, substantially, or entirely submerged in, for example, water. For example, a particular region or position in a near-shore or offshore location may be desired to be marked such that the region or position can be selectively observed or detected from an airborne or from a near earth orbit, for example, by a hyperspectral sensor 30. In operation, for instance, an intended beach landing zone that has been the subject of previous reconnaissance, or a position of downed military personnel or equipment in a sensitive location 61 may be marked. For example, the signaling device 10 may be deployed such that the directional biasing elements 34 and/or 34*a* operate to keep the deployable member 12 in a substantially fully deployed state underwater due to such things as wave action, turbulence, and/or currents. In one embodiment of the present invention an anchor 63 and an associated tether 65 may be attached to the deployable signaling device 10. It should be noted that the anchor 63 may be a portion of a storage unit used to deliver the deployable signaling device 10 to the desired location. When deployed, the deployed signaling device 10 can be observed and/or detected from above, yet remain substantially undetectable form a near shore or offshore location. In addition, through selective use of material which can be detected in portions of the electromagnetic spectrum outside that easily detectable though use of human vision this selective detectability in sensitive areas can be enhanced.

Figure 13:
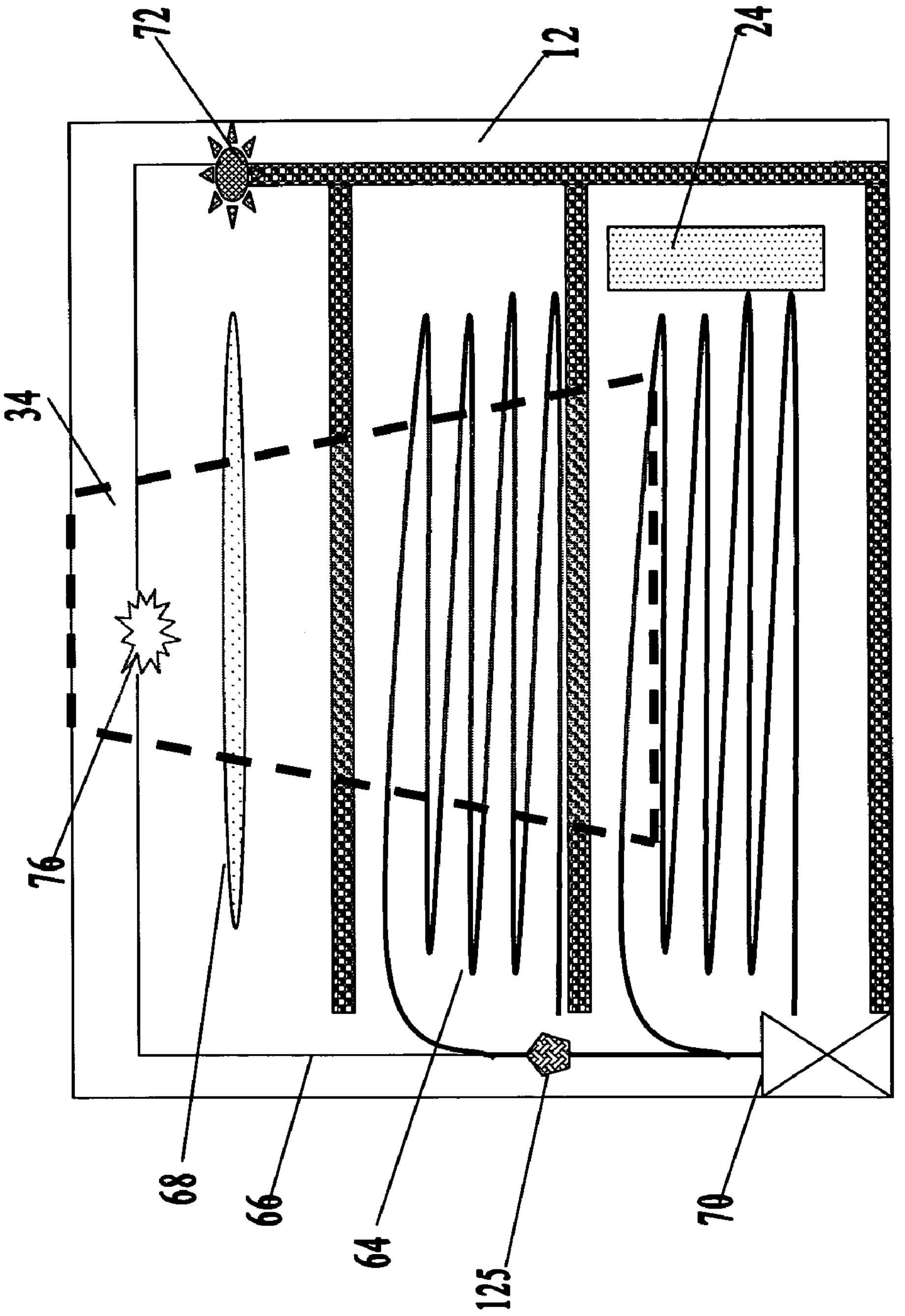
FIG. 13 shows a portion of a deployable signaling device which includes an associated array having various detectability modifying elements consistent with the present invention.

In another embodiment of the present invention as shown in FIG. 13, the deployable signaling device 10 includes an array 64 which may be associated with, for example, an electrical pathway 66; a chemical compound or compounds 68; electromagnetic wave emitting elements 70; and/or with electromagnetic channeling features, for example, fiber optic elements 72, which based on their individual or combined properties allow for interaction with a propagated energy wave such that portions of the deployable signaling device 10 have a modified detectability, or are caused to have a modified detectability.

Figure 14:
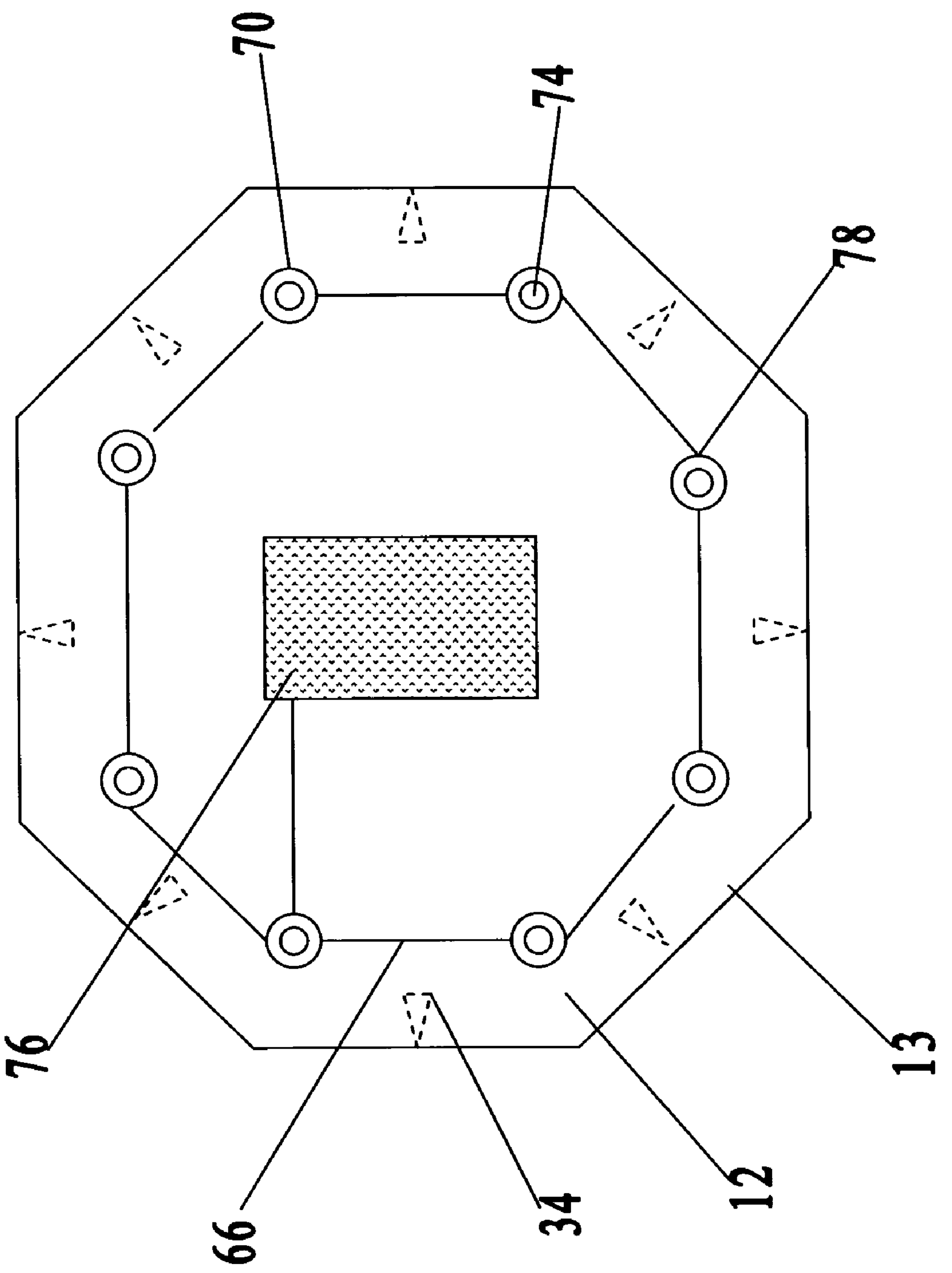
FIG. 14 shows a polygonal deployable signaling device which includes a power source and electromagnetic energy elements consistent with the present invention.

In one embodiment of the present invention, as shown in FIG. 14 the deployable signaling device 10 may include an electromagnetic wave emitting element 70 which can be energized by a power source 76 such that it can be electromagnetically be distinguished from the surrounding background by unique electromagnetic wavelength emission and/or reflection signatures, wherein electromagnetic wavelengths not only include, but are not limited to, visible light, but also near-infrared, mid-infrared, thermal, radio, and microwave energy. For example, the electromagnetic wave emitting element 70 may produce heat when energized by a power source 76 and thus provides a unique electromagnetic wavelength signature relative to a background of a different temperature. It should be understood that the power source 76 may, for example, be a solar panel, a battery, a generator, or other device or assembly which produces electrical current.

Figure 15:
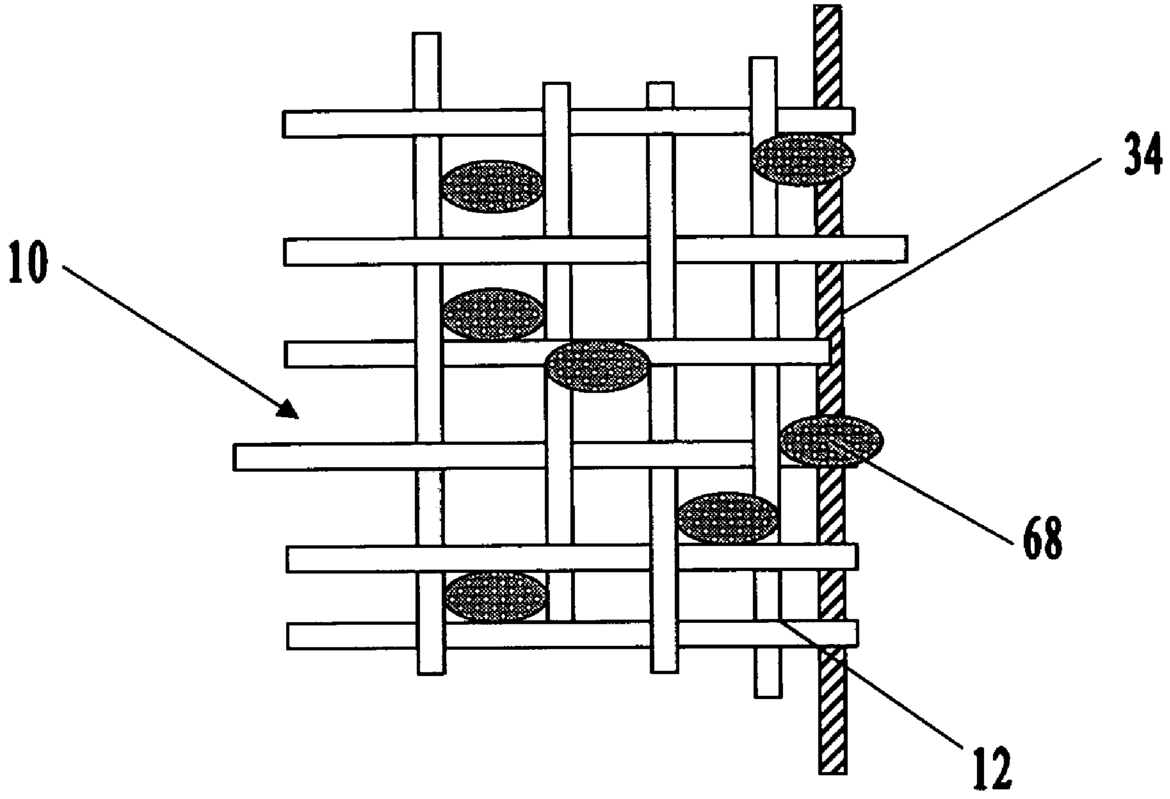
FIG. 15 shows a magnified view of a portion of a deployable signaling device which includes an associated chemical composition consistent with the present invention.

In one embodiment of the present invention, as shown in FIG. 15, the deployable signaling device 10 may be associated with a chemical composition 68 which exhibits detectable properties when deployed. For example, portions of the deployable signaling device may be impregnated with, coated with, wetted with, dusted with, or otherwise associated with chemicals 68 which react when exposed to the deployment environment. For example, the deployable signaling device 10 may be associated with a chemical 68 which produces an exothermic or endothermic reaction or process when exposed to such things as moisture or oxygen. For example, the chemical compound 68 may be metallic oxides, zeolites, ammonium nitrate, or other chemical compositions which produce a temperature change which can be detected.

Figure 16:
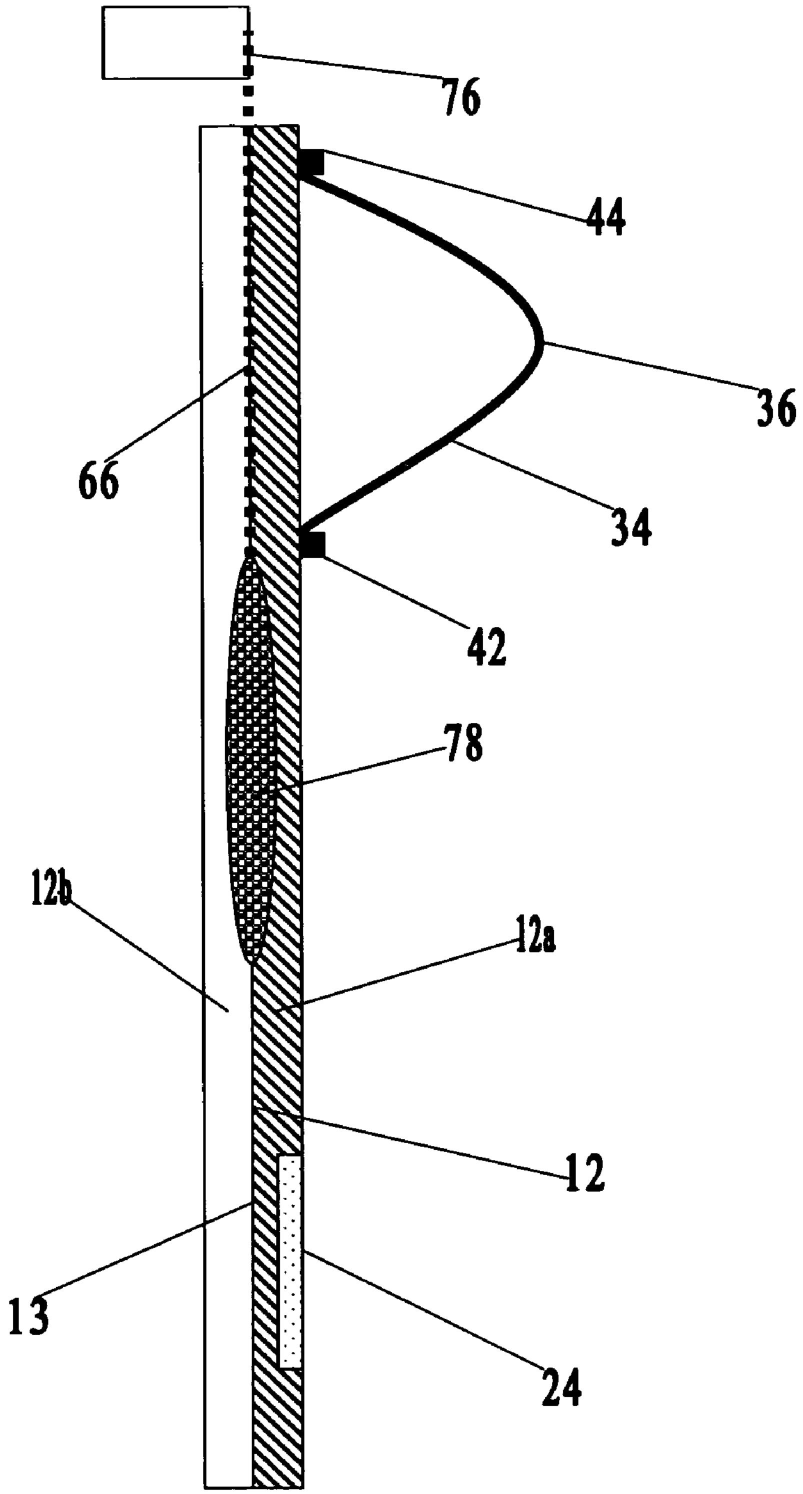
FIG. 16 shows a cut away portion of a deployable signaling device wherein the deployable member is a laminate which includes laminate materials having synergistic and/or disparate properties, an electromagnetic energy emitting element positioned between the laminate layers, and an associated power source consistent with the present invention.

In one embodiment of the present invention, as shown in FIG. 16, the deployable signaling device 10 may be associated with an electromagnetic wave emitting element 70, for example, a light emitting diode (LED) 78 which may be energized to produce a detectable signal. For example, semiconductor elements, such as a light active sheet 74, an LED, or other electromagnetic wave emitting element 70 may be associated at various positions on the deployable member 12 such that when energized by a power source 76 they emit detectable electromagnetic energy. The power source 76 may, for example, be a solar panel, a battery, a generator, and/or other device or assembly which produces electrical current. In one embodiment of the present invention, the power source 76 may be a solar panel and an electrically associated storage device 125, for example a battery, which operates to power an electromagnetic wave emitting element 70 during periods of darkness.

In one embodiment of the present invention, the electromagnetic wave emitting element 70, for example, an LED 78 may be positioned at an interface 13 between layers of a laminated deployable member 12, wherein a first laminate layer 12*a* has, for example, an advantageous buoyancy, thermal and/or electrical conductivity, reflectivity, and/or other advantageous characteristics. A second laminate layer 12*b* may be adhered, bonded, melded, interwoven, stitched, or otherwise associated to the first laminate layer 12*a*. The second laminate layer 12*b* may be, for example, substantially clear, reflective, metalized, electrically and/or thermally conductive, and/or possess some other advantageous characteristics. For example, the first laminate layer 12*a* may formed from a material that is positively buoyant in water, and the second laminate layer 12*b* may be a reflective metalized Mylar type film associated with the first laminate layer 12*a*. As another example, the first laminate layer 12*a* may formed from a material that is positively buoyant in water, and the second laminate layer 12*b* may have portions that are substantially clear and are aligned with a light producing element, for example, LED 78 elements located between the laminate layers such that the LED 78 elements are visible through the second laminate layer 12*b* when it is associated with the first laminate layer 12*a*. As another example, the first laminate layer 12*a* may formed from a material that is positively buoyant in water and has advantageous thermal absorption, thermal capacity and/or thermal insulative properties such that impinging solar radiation, generated heat or cold, or the like may be retained and/or emitted from the first laminate layer through, for example, the second laminate layer 12*b*. In one embodiment of the present invention, the first laminate layer 12*a* is spaced apart in areas from the second laminate layer 12*b* by, for example, an air or gas pocket. Thus, for example, when the second layer is substantially clear, and the second layer absorbs solar radiation the air or gas pocket may operate to enhance heat generation and/or retention.

Figure 17:
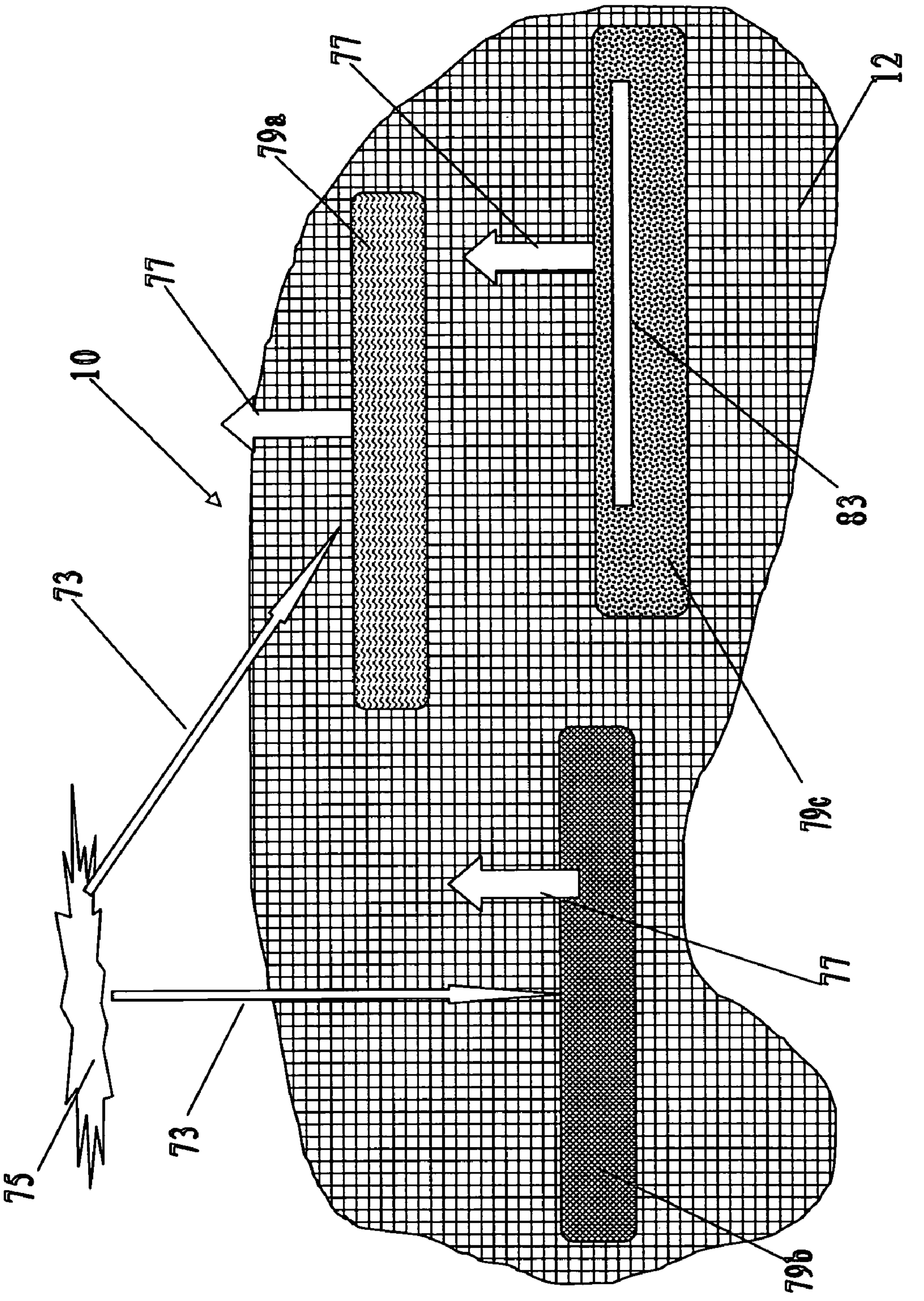
FIG. 17 shows a portion of a deployable signaling device which includes light producing elements consistent with the present invention.

In one embodiment of the present invention, as shown in FIG. 17, the fluorescence of light producing elements 79*a* associated with, for example, the deployable member 12 may be utilized wherein the energy 73 from an external source 75 is absorbed by such light producing element 79*a* and as a result detectable light 77 is emitted by the light producing element 79*a* such that the emitted light 77 has a wavelength that is longer than the initial external energy source.

In one embodiment of the present invention phosphorescence of light producing elements 79*b* associated with the deployable member may be utilized wherein the energy 73 is used to excite portions of the light producing elements 79*b* such that light 77 energy is emitted that it is detectable, for example, visually, or by other detection means.

In one embodiment of the present invention chemiluminescence of light producing elements 79*c* associated with, for example, the deployable member 12 may be utilized wherein production of detectable energy, for example, light occurs when the excitation energy has come from a chemical reaction, wherein, for example, a first chemical composition 83 is combined with a second chemical composition 85 which results in light being produced.

In one embodiment of the present invention enzymes, proteins, intermediates, and/or other components of a biological system may be incorporated into portions of the deployable member such that detectable energy is produced utilizing, for example, the illustrative pathway Luciferin+Luciferase+Oxygen+Salt->Light+Byproduct. As another example, a protein Green Fluorescent Protein, which possess a wide variety of spectral properties, and includes 238 amino acid, and which was first identified to be associated with the sea jelly Aequoria Victoria may be utilized in various aspects of the present invention. Green Fluorescent Protein and/or its variants and relatives as well as the similar proteins can be utilized due to their ability to produce light when stimulated by energy obtained following oxidation of luciferin or another photoprotein. It should be also be noted that the green fluorescent protein gene can be cloned and transfected into target cells of choice such that emission of the green fluorescent light can be achieved. The source of the fluorescence in one embodiment of the present invention is related to the spontaneous rearrangement and oxidation of the amino acid sequence Ser-Tyr-Gly.

In one embodiment of the present invention, a desirable spectral property, termed photoswitching may be utilized wherein the photoswitching includes the electromagnetic wave alteration of the optical properties of certain Green Fluorescent Protein members having a reversible photochromic behavior with a relatively high fluorescence to dark state ratio.

Figure 18:
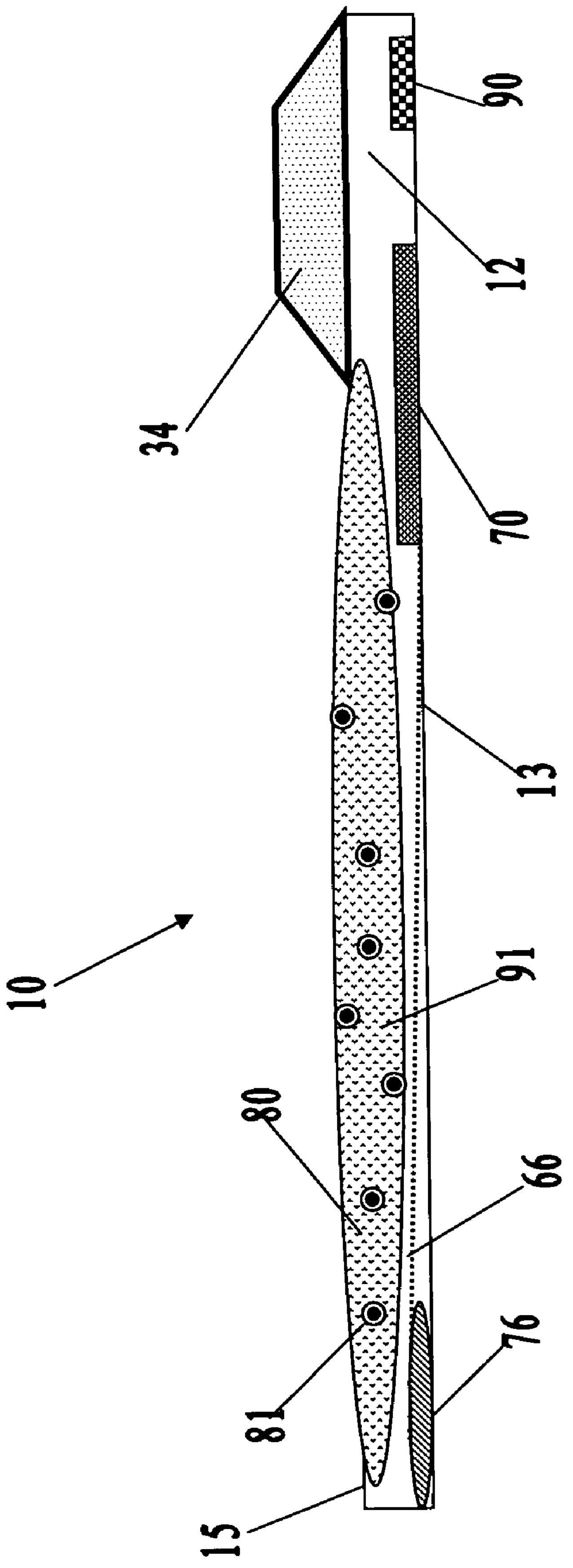
FIG. 18 shows a portion of a deployable signaling device which includes a biological activity element consistent with the present invention.

In one embodiment of the present invention, as shown in FIG. 18 the deployable signaling device 10 may be associated with a biological organism, for example, bacteria, dinoflagellates and/or coelenterates, biological elements, and/or nutrients which allow or enhance a luminescence which is detectable. For example, *Photobacterium phosphoreum, P. lelognathi, Vibrio harveyi, V. fischeri, V. salmonicidi, V. logei* may be advantageously associated with the deployable signaling device 10 such that colonization in, on, and/or about portions of the deployable signaling device 10 takes place.

In one embodiment of the present invention, such things as biological organisms, recombinant or other modified organisms, and/or biological elements may be utilized wherein the biological pathway/process which produces luminescence may be utilized to produce a detectable signal. For example, biological activity elements 80 may be associated with portions of the deployable signaling device 10. These biological activity elements may contain such things as matrix forming materials 91 and selected biological organisms 81 that upon exposure to, for example, seawater, form an advantageous environment for such things as the growth of selected biological organisms 81. For example, the matrix forming materials 91 may be various gels, polymers, biopolymers, nonionic block copolymers, alginates, inorganic gel forming compositions, polyacrylates, and/or other materials which may be utilized in forming the matrix forming materials 91. As an additional example, a suitable growth environment and/or nutrient release matrix may be formed by the matrix forming materials 91 when block copolymers having a relatively high molecular weight and high PLGA content are used such that they become water-insoluble and swell in water. For example, block copolymers consisting of hydrophilic and hydrophobic blocks are able to form physical cross linking in an aqueous environment through hydrophobic interaction, chain entanglement, or crystalline micro-domains such that they form a suitable matrix forming materials 91. The matrix forming material 91 may be configured to achieve a relatively highly porous polymer foam, such that the pore size is large enough so that biological organisms can penetrate the pores. In addition the pores can be interconnected to facilitate nutrient and waste exchange by biological organisms deep within the matrix forming materials 91. For example, PGA fibers can be bonded together in three-dimensions in order to provide a relatively large surface area for biological interaction and growth. In addition, methods such as solvent casting/particulate leaching, gas foaming/particulate leaching and liquid-liquid phase separation may be used to produce relatively large, interconnected pores to facilitate biological support, colonization, and nutrient/waste flow.

Figure 18A:
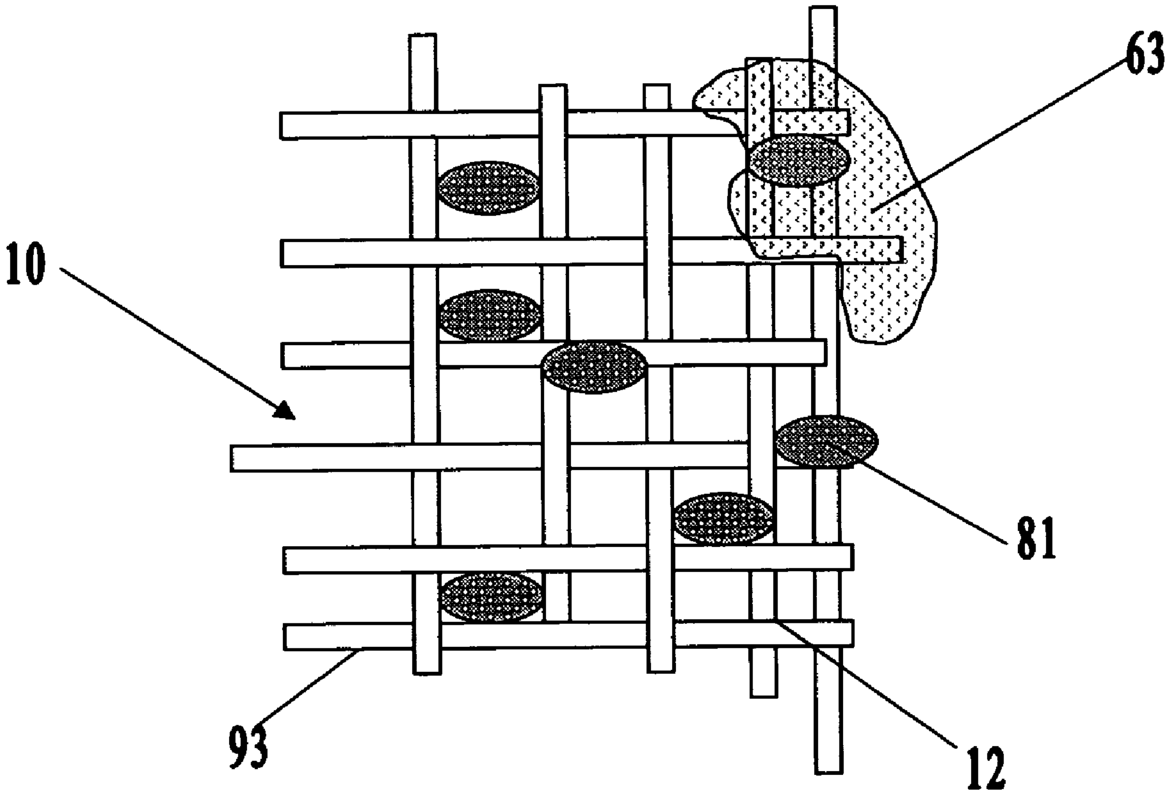
FIG. 18A shows a magnified view of a portion of a deployable signaling device which includes associated selected biological organisms consistent with the present invention.

In one embodiment of the present invention, as shown in FIG. 18A, the selected biological organism 81 may be present in the suitable matrix material 63 which operates to stabilize, adhere, and/or otherwise advantageously associate the selected biological organism 81 to, for example, the deployable member 12. In one embodiment of the present invention, the matrix material 63 forms a 3-D network hydrogel which allows for selective colonization of luminescent bacteria and/or provides added stability to the deployable member 12 when deployed in, for example, water. For example, all, many, or some of the materials utilized in forming the matrix forming materials 91, shown in FIG. 18, may be used for forming the matrix material 63. It should be understood that various materials may also be utilized, for example as strands 93, to allow the deployable member 12, or other structures associated with the deployable signaling device 10 to, for instance, degrade over time in the deployment environment. For example, the strands 93 may be formed of gelatin, poly galactic acid (PGA) poly lactic acid (PLA), poly(lactic-co-glycolic acid) (PLGA), biodegradable polyesters, poly(ethylene glycol) (PEG), polyhydroxybutyrate (PHB), polyhydroxyvalerate (PHV), polydioxanone (PDS), polypropylene, collagen, alginates, and/or other similar material. For example these materials may be utilized to form strands 93, as shown in FIG. 18A. The strands may be woven into or otherwise associated with the deployable member 12.

In another embodiment of the present invention, the deployable signaling device 10 may be deployed with freeze dried, gel encapsulated, polymer encapsulated, and/or a otherwise stabilized biological organism and/or biological component, for example in the biological activity element 80 such that upon deployment into, for example, seawater, there is a colonization of portions of the deployable signaling device 10 by the stabilized biological organism and/or by biological organisms present in the seawater such that the deployable signaling device 10 becomes detectible due to biological activity occurring on, in, and/or about its structure. It should be noted that such things as generation time, water temperature, the organism selected, can be factored into the time required between deployment of the deployable signaling device 10 and modified detectability characteristics due to, for example, biological growth.

In one embodiment of the present invention biological activity enhancement elements, for example, nutrients, growth factors, or the like may be associated with the deployable signaling device 10 such that biological and/or biological components delivered with the deployable signaling device 10 into an operating environment. In addition, or alternatively, biological activity enhancement elements may be associated with the deployable signaling device 10 such that biological organisms present in the operating environment are given a selective advantage and thus colonize on, in, and about the structure of the deployable signaling device 10.

Figure 19:
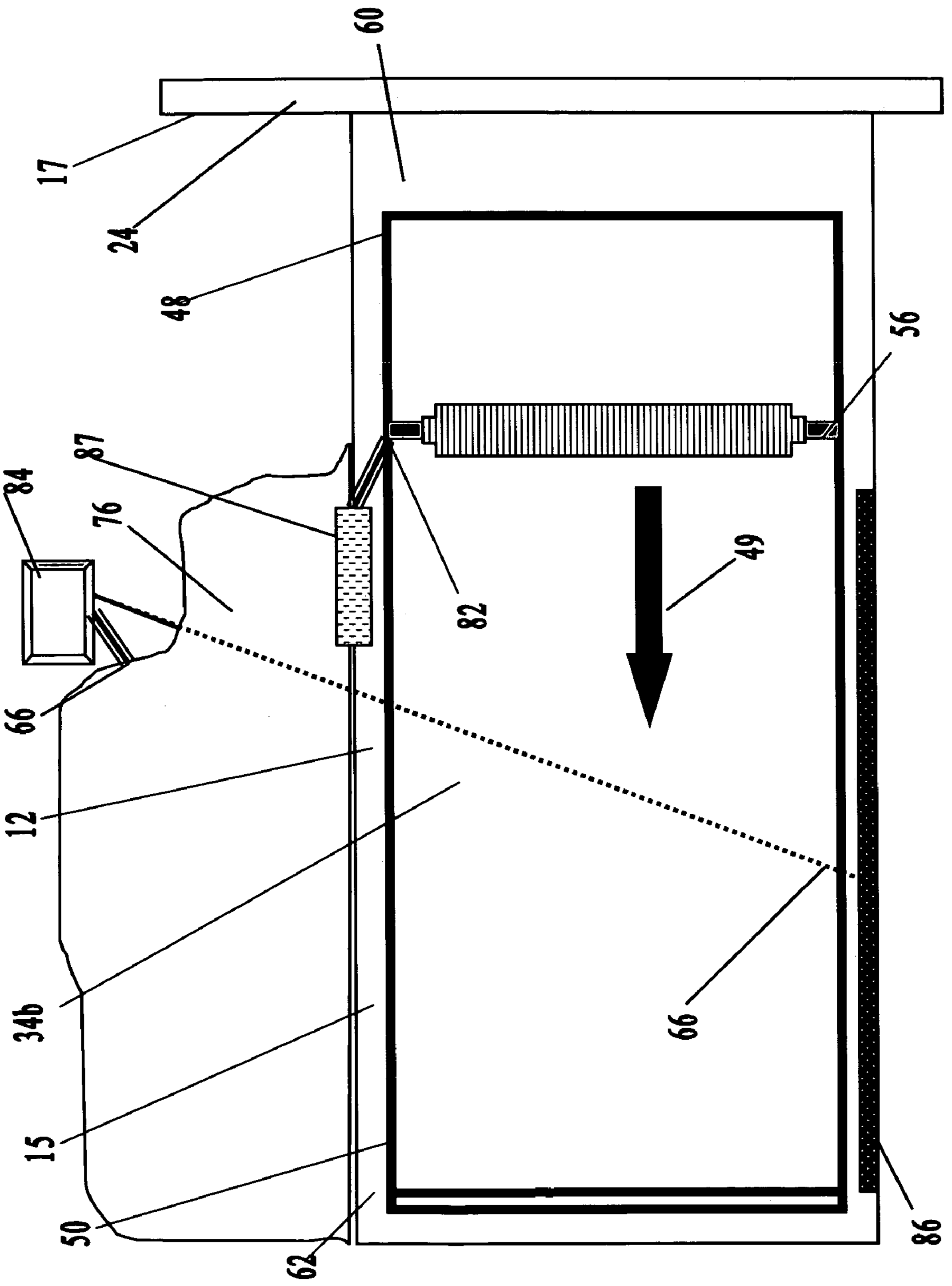
FIG. 19 shows a portion of a deployable signaling device which includes a solar panel and optional associated motorized directional biasing element consistent with the present invention.

In one embodiment of the present invention, as shown in FIG. 19, the deployable signaling device 10 may have a power source 76, such as a solar panel, which is electronically connected to a wide variety of devices, for example, a motorized directional biasing element **34*b* having a propulsion element 82 to provide thrust, that moves liquid in a preferential direction 49, such that the directional biasing element 34*b* travels in liquid toward its directional end 40*a* and away from its drag end 38*a*; a radio transmitter 84; an antenna array 86; and/or a electrical storage device 87**.

In one embodiment of the present invention, the deployable signaling device 10, as shown in FIG. 18, includes a passive semi-passive and/or active Radio Frequency Identification (RFID) device 90. For example, the active RFID may allow relatively low level radio frequency signals to be received by the RFID device 90 and in response the RFID device 90 can a relatively high level signal back to a reader/interrogator device. Passive RFID elements for example, reflect energy from a reader/interrogator device and/or may receive and temporarily store energy from the reader/interrogator device signal such that the passive RFID can generate a signal response. Semi-passive RFID elements, for example are similar to passive RFID elements, however, they may have an internal power source which can, for example, allow the device to monitor the deployment environment and/or extent the devices signal range. RFID devices frequencies utilized with the present invention may include 125-134 KHz, low frequency, 13.56 MHz, high frequency, 868 to 928 MHz, ultra-high frequency, and 2.45, 5.8, and higher GHz frequencies, microwave. In one embodiment of the present invention, harmonic direction-finding (HDF) system has been designed for the localization of small mobile targets using (RFID).

In one embodiment of the present invention, the RFID device 90 may be associated with, for example, the deployable member 12. The RFID device 90 can operate, for instance, to communicate with an onboard computer in an aircraft at the moment the that deployable signaling device 10 is separated from the aircraft, or may operate to track the deployable signaling device 10 in a inventory/maintenance schedule, or may operate to aid location of the deployable signaling device 10 separately or in combination with other detectable elements of the deployable signaling device 10.

Figure 20:
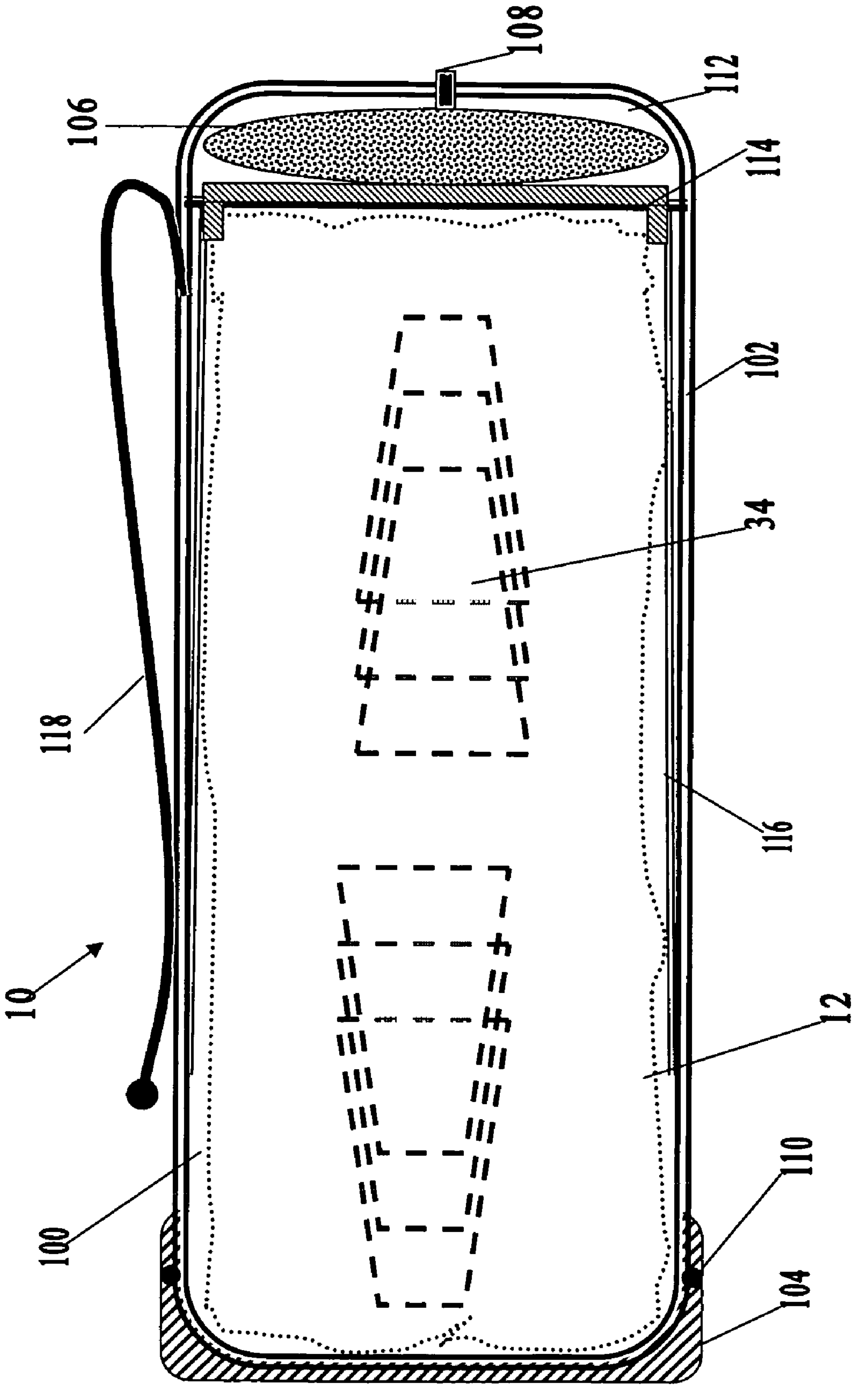
FIG. 20 shows a deployable signaling device that includes a deployment storage container consistent with the present invention.

In one embodiment of the present invention, as shown in FIG. 20, the deployable signaling device 10 includes a storage device 100. The storage device 100 may be configured such that it includes a pressure casing 102, a lid 104, an ejector 106, and an actuator 108 for actuating the ejector 106. The storage device 100 may be sealed by, for example, o-rings 110 to prevent moisture from entering the storage cavity 112 and contacting the deployable member 12.

In one embodiment of the present invention, the deployable member 12 may be associated with the storage cavity 110 such that upon actuation the ejector 106 acts upon, for example, a deployment wad 114 and associated guide assembly 116 such that the deployable member 12 is expelled from the storage device 100 in an advantageous manner. The ejector 106 may be, for example, a spring, an explosive mixture, a compressed gas, expanding foam that is actuated by water entering the ejector chamber 112 through the actuator 108, or a reactive mixture that produces gas when water enters the ejector chamber 112 through the actuator 108. The storage device 100 may also include a fastening element, for example, a clip 118 for attaching the storage device 100 to, for example, web gear, a life boat, or other equipment.

While an embodiment of the foregoing invention has been set forth for purposes of illustration, the foregoing description should not be deemed a limitation of the invention herein. Accordingly, various modification, adaptations and alternatives may occur to one skilled in the art without departing from the spirit and the scope of the present invention.

The invention claimed is:

1. A signaling device comprising: a detectable element having a border area, a center axis, a substantially planar upper surface and a substantially planar lower surface; and at least two directional biasing elements associated the border area of the lower surface, said directional biasing elements having a drag end and a directional end, wherein the drag end of one directional biasing element is separated from the drag end of the other directional biasing element by the center axis, and wherein the drag end of one directional biasing element is oriented in a substantially opposite direction than the drag end of the other directional biasing element, wherein the detectable element includes a substantially planar laminate comprising a first layer and a second layer, said first layer being substantially optically clear, and said second layer being associated with the directional biasing elements and having thermal energy absorptive properties; and wherein intermediate the first layer and the second layer is an electromagnetic generating element.

2. The signaling device of claim 1, wherein the detectable element is associated with at least one selected biological organism and a matrix material, wherein said matrix material includes block copolymers consisting of hydrophilic and hydrophobic blocks.

3. The signaling device of claim 1, wherein said second layer is positively buoyant in water.

4. The signaling device of claim 1, further including a plurality of buoyancy elements, wherein the buoyancy elements are fluidly connected and contain a buoyancy modifying material.

5. The signaling device of claim 1, further including at least one light emitting diode.

6. The signaling device of claim 1, further including a storage container.

7. A signaling device system comprising:

a substantially gas permeable deployable member being comprised of a single layer of material which is positively buoyant in water, said deployable member having a border area, a center axis, a substantially planar upper surface and a substantially planar lower surface; and at least two directional biasing elements associated with the border area of the lower surface, said directional biasing elements having a drag end and a directional end, wherein the drag end of one directional biasing element is separated from the drag end of the other directional biasing element by the center axis, and wherein the drag end of one directional biasing element is oriented in a substantially opposite direction than the drag end of the other directional biasing element; and wherein said directional biasing elements each include a panel having a first panel edge and a second panel edge, said first panel edge and said second panel edge being attached to the deployable member.

8. The signaling device of claim 7, wherein the directional biasing elements are substantially hollow and the drag end is fluidly connected with the directional end.

9. The signaling device of claim 7, wherein the directional biasing element is associated with at least one buoyancy modifying element.

10. The signaling device of claim 7, wherein the substantially gas permeable deployable member is comprised of at least one biological activity element which emits detectable light in the presence of water.

11. The signaling device system of claim 7, further including an electromagnetic wave emitting element associated with the deployable member, a power source electrically connected to said electromagnetic wave emitting element.

12. The signaling device system of claim 11, wherein the electromagnetic wave emitting element includes a light active sheet.

* * * * *